(12) United States Patent
Merrill et al.

(10) Patent No.: US 9,081,147 B2
(45) Date of Patent: Jul. 14, 2015

(54) EFFECTIVE MEDIA RETARDER FILMS WITH SPATIALLY SELECTIVE BIREFRINGENCE REDUCTION

(75) Inventors: William Ward Merrill, White Bear Lake, MN (US); Douglas S. Dunn, Maplewood, MN (US); David T. Yust, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 577 days.

(21) Appl. No.: 13/342,807

(22) Filed: Jan. 3, 2012

(65) Prior Publication Data

US 2013/0170034 A1 Jul. 4, 2013

(51) Int. Cl.
| | |
|---|---|
| G02B 5/30 | (2006.01) |
| G02B 5/32 | (2006.01) |
| B29D 11/00 | (2006.01) |
| B42D 25/29 | (2014.01) |
| G02F 1/13363 | (2006.01) |

(52) U.S. Cl.
CPC .......... *G02B 5/3083* (2013.01); *B29D 11/0073* (2013.01); *B29D 11/00644* (2013.01); *B42D 25/29* (2014.10); *G02B 5/32* (2013.01); *G02F 1/13363* (2013.01); *G02F 2413/09* (2013.01)

(58) Field of Classification Search
None
See application file for complete search history.

(56) References Cited

U.S. PATENT DOCUMENTS

| | | | |
|---|---|---|---|
| 4,864,537 | A | 9/1989 | Michl |
| 5,389,324 | A | 2/1995 | Lewis |
| 5,882,774 | A | 3/1999 | Jonza |
| 5,968,666 | A | 10/1999 | Carter |
| 6,179,948 | B1 | 1/2001 | Merrill |
| 6,207,260 | B1 | 3/2001 | Wheatley |
| 6,368,699 | B1 | 4/2002 | Gilbert |

(Continued)

FOREIGN PATENT DOCUMENTS

| | | |
|---|---|---|
| GB | 2 420 188 | 12/2006 |
| WO | WO 98/21521 | 5/1998 |

(Continued)

OTHER PUBLICATIONS

Li, et al., "Photoresponsive layer-by-layer ultrathin films prepared from a hyperbranched azobenzene-containing polymeric diazonium salt.," vol. 517, No. 6, Jan. 30, 2009, pp. 2055-2062. ISSN: 0040-6090.

(Continued)

*Primary Examiner* — Derek S Chapel
(74) *Attorney, Agent, or Firm* — Yufeng Dong; Eric Silverman; Stephen C. Jensen

(57) ABSTRACT

A retarder film provides a first light retardation and can be heat processed in one or more selected areas to provide a second light retardation in the selected area(s). The retarder film may have an absorption characteristic such that the heat processing can be carried out by selectively exposing the film to a suitable radiant beam. The retarder film is composed of a stack of contiguous ultrathin layers configured to provide an effective optical medium for visible light. Visible light propagates through the stack as an effective medium having effective refractive indices along principal x-, y-, and z-axes. At least some of the ultrathin layers possess intrinsic birefringence, and the effective indices of the stack are functions of the intrinsic refractive indices of the constituent ultrathin layers. The heat processing is carried out so that the ultrathin layer stack structural integrity is not substantially altered in the processed area(s).

20 Claims, 12 Drawing Sheets

(56) References Cited

U.S. PATENT DOCUMENTS

| | | |
|---|---|---|
| 6,590,707 B1 | 7/2003 | Weber |
| 6,783,349 B2 | 8/2004 | Neavin |
| 6,939,499 B2 | 9/2005 | Merrill |
| 6,949,212 B2 | 9/2005 | Merrill |
| 7,116,387 B2 | 10/2006 | Tsai |
| 2003/0072931 A1* | 4/2003 | Hebrink et al. ............... 428/212 |
| 2006/0082702 A1 | 4/2006 | Jacobs |
| 2008/0083998 A1 | 4/2008 | Merrill |
| 2008/0085383 A1 | 4/2008 | Merrill |
| 2009/0273836 A1 | 11/2009 | Yust |
| 2011/0042358 A1 | 2/2011 | Albanese |
| 2011/0042364 A1 | 2/2011 | Bailey |
| 2011/0042368 A1 | 2/2011 | Alves |
| 2011/0249332 A1 | 10/2011 | Merrill |
| 2011/0249334 A1 | 10/2011 | Merrill |
| 2011/0255163 A1 | 10/2011 | Merrill |
| 2011/0255167 A1 | 10/2011 | Merrill |
| 2011/0286095 A1 | 11/2011 | Merrill |

FOREIGN PATENT DOCUMENTS

| | | |
|---|---|---|
| WO | WO 99/53242 | 10/1999 |
| WO | WO 01/75490 | 10/2001 |
| WO | WO 2004/003630 | 1/2004 |
| WO | WO 2004/004362 | 1/2004 |
| WO | WO 2010/075340 | 7/2010 |
| WO | WO 2010/075363 | 7/2010 |
| WO | WO 2012/003215 | 1/2012 |

OTHER PUBLICATIONS

Guo et al., "Scandium-Catalyzed Cyclocopolymerization of 1, 5-Hexadiene with . . . ," Macromolecules 2011, vol. 44, pp. 6335-6344.

Karman, et al., Proc. Eurodisplay, (2002), p. 515-517.

C.H. Tsai et al., Proc. of SPIE, vol. 3957 (2000), p. 142-152.

\* cited by examiner

EFFECTIVE MEDIA RETARDER FILMS WITH SPATIALLY SELECTIVE BIREFRINGENCE REDUCTION

FIELD OF THE INVENTION

This invention relates generally to optical films, with particular application to optical films that are or that include retarder films, and associated articles, systems, and methods.

BACKGROUND

Retarder films, sometimes also referred to as retarder plates, are known. A retarder film is constructed such that when normally incident unpolarized light passes through the film, one linear polarization state is delayed or "retarded" relative to an orthogonal linear polarization state. Light of the delayed polarization state is said to be polarized along an in-plane axis of the film referred to as the "slow axis", and light of the other polarization state is said to be polarized along an orthogonal in-plane "fast axis". Retarder films are tailored to provide a desired amount of delay or "retardation", and the retardation may be measured or specified in terms of a fraction of a design wavelength of light. For example, a quarter-wave retarder causes light polarized along the slow axis to be one-fourth of a wavelength out of phase (and delayed) with respect to light polarized along the fast axis. Likewise, a half-wave retarder causes light polarized along the slow axis to be one-half of a wavelength out of phase (and delayed) with respect to light polarized along the fast axis. In these cases, the referenced "wavelength" may be a wavelength in the middle of the visible spectrum, e.g., 560 nm. Retardation may alternatively be measured in terms of the physical or optical distance that the wavefront of the delayed polarization lags behind the wavefront of the other polarization as light of the two polarization states emerge from the retarder film. (The optical distance is the physical distance multiplied by the applicable refractive index.) For the quarter-wave and half-wave examples just mentioned, the retardations are 140 nm (=560/4) and 280 nm (=560/2), respectively.

A retarder film can be designed to have specified relationships between its refractive indices along principal mutually perpendicular x-, y-, and z-axes, where the x- and y-axes are assumed to lie in the plane of the film, and the z-axis is assumed to be perpendicular to the film plane and parallel to a thickness axis of the film. The retarder film can be characterized in terms of its refractive indices along these principal axes. In this regard, we can refer to nx, ny, and nz as the refractive index of the retarder film for light whose electric field vibrates parallel to the x, y, and z axes, respectively. If nx, ny, and nz are all equal or substantially equal to each other, then the film is substantially isotropic, and no significant retardation occurs. In this isotropic case, the film functions as a window film, which does not delay or retard any polarization state relative to any other polarization state, rather than a retarder film. In other cases, the film may be uniaxially birefringent, which means that two of the principal refractive indices nx, ny, nz are equal or substantially equal to each other, and the remaining refractive index is significantly different from the other two. The two refractive indices that are substantially equal are referred to as the ordinary refractive index, and the other refractive index is referred to as the extraordinary refractive index. When one of the in-plane refractive indices (nx or ny) is equal or substantially equal to nz, and the remaining in-plane refractive index (ny or nx respectively) is substantially different, the uniaxially birefringent film is referred to as an "a-plate" retarder film. On the other hand, when the two in-plane refractive indices nx and ny are equal or substantially equal to each other, and nz is substantially different, the uniaxially birefringent film is referred to as a "c-plate" retarder film. As a consequence of these refractive index relationships, a c-plate retarder film provides no significant retardation for light that is normally incident on the film, but does provide retardation for light that is obliquely incident on the film. An a-plate retarder film, in contrast, provides retardation both for normally incident light and obliquely incident light.

In still other cases, the film may be biaxially birefringent, which means that all three principal refractive indices are significantly different from each other. A biaxially birefringent retarder film provides retardation both for normally incident light and obliquely incident light.

BRIEF SUMMARY

We have developed a family of articles in which a retarder film can provide a first light retardation, and can be heat processed in one or more selected areas or zones of the film to provide a second light retardation in the selected area(s), while providing the first light retardation in non-processed areas. The retarder film is preferably provided with an absorption characteristic such that, by selectively exposing the film to a suitable radiant (energy) beam, the beam can absorptively heat the film in the selected area(s). Typically, the radiant beam includes or consists essentially of light in the ultraviolet (UV), visible or infra-red (IR) portion of the electromagnetic spectrum. Rather than being composed of a uniform optical medium such as a unitary layer of polymer material, the retarder film is composed of a stack of contiguous ultrathin layers configured to provide an effective optical medium for visible light. The ultrathin layers within the stack are so thin that visible light propagates through the stack as if it were a non-layered medium, i.e. as if it were an effective medium that has "effective refractive indices" along the principal x-, y-, and z-axes, the effective refractive indices being functions of the intrinsic refractive indices of the constituent ultrathin layers. The stack of contiguous ultrathin layers therefore does not provide any significant reflection bands for substantially all visible wavelengths, regardless of polarization state. The heat processing can be carried out in such a way that the structural integrity of the ultrathin layer stack is not substantially altered in the processed area(s).

The present application therefore discloses, inter alia, optical articles that include a retarder film providing a first light retardation and comprising an effective medium stack of contiguous ultrathin layers configured to provide an effective optical medium for visible light. The ultrathin layers are arranged into a plurality of optical repeat units each of which has an optical thickness of less than 190 nm, the ultrathin layers including different first and second ultrathin layers. The first ultrathin layers comprise a first polymer material exhibiting a first intrinsic birefringence, and the second ultrathin layers comprise a second polymer material different from the first polymer material. The retarder film also has a first absorption characteristic that is suitable to, upon exposure to a first radiant beam, absorptively heat the effective medium stack by an amount sufficient to change the first light retardation to a second light retardation, different from the first light retardation, while maintaining a structural integrity of the effective medium stack. One or both of the first and second light retardations of the optical article may be substantially attributable to corresponding light retardations of the effective optical medium, or one or both may be attributable to corresponding light retardations of the effective optical medium in combination with those of other layer(s) of the optical article, such as one or more optically thick protective boundary layer(s) and/or one or more optically thick skin layer(s).

The stack of contiguous ultrathin layers may include the first ultrathin layers alternating with the second ultrathin layers, and each of the optical repeat units may include, and may consist essentially of, one of the first ultrathin layers and one of the second ultrathin layers. The second polymer material, in some cases, is substantially isotropic.

The effective medium stack of the retarder film may in some cases exhibit no substantial form birefringence. In such cases, the retardation due to form birefringence is less than a threshold value such as 10 nanometers, or the retardation due to form birefringence is less than a given percentage, e.g. 5%, of an average out-of-plane (z-index) birefringence, e.g. as described further in connection with equations (10a) and (10b) below. Here, the reader is cautioned to not necessary assume that just because the stack exhibits no substantial form birefringence that the stack also exhibits no birefringence at all. The stack can in all cases be characterized by effective indices nx, ny, nz along the principal x-, y-, and z-axes. The question of whether the stack exhibits any birefringence at all is answered by determining whether the effective refractive indices nx, ny, and nz are equal or substantially equal to each other. If they are substantially equal, the stack exhibits no birefringence, and otherwise the stack does exhibit birefringence. Form birefringence, if present, contributes to the value of the effective refractive index nz of the stack.

In some cases, the second polymer material of the second ultrathin layers exhibits a second intrinsic birefringence different from the first intrinsic birefringence. The second intrinsic birefringence may be of the same sign, or opposite in sign, relative to the first intrinsic birefringence. As an example of the second intrinsic birefringence being of opposite sign to the first intrinsic birefringence, the first polymer material may have n1x>n1y, in which case the second polymer material would have n2x<n2y.

The second light retardation, i.e., the retardation in the processed area(s) of the retarder, may be greater than the first light retardation, i.e., the retardation in the unprocessed area (s) of the retarder. For example, the first light retardation may be an insignificant retardation for visible light, e.g., less than 20 nm over a wavelength range from 380 to 780 nm, and the second light retardation may be a significant retardation for visible light, e.g., at least 95 nm over the 380 to 780 nm wavelength range.

The second polymer material of the second ultrathin layers may have a melting temperature different from that of the first polymer material, such that upon exposure of the retarder film to the first radiant beam, the absorptive heating is sufficient to change the first intrinsic birefringence of the first ultrathin layers without substantially changing the second intrinsic birefringence of the second ultrathin layers. The first and second ultrathin layers may be configured such that upon exposure of the retarder film to a second radiant beam different from the first radiant beam, the effective medium stack is heated by an amount sufficient to change the first light retardation to a third light retardation, different from the first and second light retardations, while still maintaining the structural integrity of the effective medium stack. Localized heating provided by the second radiant beam may be sufficient to change or relax the intrinsic birefringence of both the first and second ultrathin layers of the stack.

The first ultrathin layers, the second ultrathin layers, or both the first and second ultrathin layers may include a radiant energy absorbing agent. The effective medium stack may comprise at least 10, 25, 50, or 100 contiguous ultrathin layers. The optical article may further include a diffuse reflective layer and a polarizer, and the polarizer may be disposed between the diffuse reflective layer and the retarder film.

A security document, such as an ID document, a passport, a vehicle license plate, a product package, an identification badge, a license, a card, a pass, a label, a certificate, a bond, a title document, a negotiable instrument, and/or currency may include any of the disclosed optical articles, and the retarder film of the optical article may include indicia defined by one or more first areas having the first light retardation and one or more second areas having the second light retardation.

We also disclose methods that include providing a retarder film having a first light retardation, and exposing an area of the retarder film to a first radiant beam. The retarder film includes an effective medium stack of contiguous ultrathin layers configured to provide an effective optical medium for visible light, the ultrathin layers including different first and second ultrathin layers, the first ultrathin layers comprising a first polymer material exhibiting a first intrinsic birefringence, and the second ultrathin layers comprising a second polymer material. The ultrathin layers are arranged into a plurality of optical repeat units each of which has an optical thickness of less than 190 nm. The exposing may be carried out to absorptively heat the retarder film by an amount sufficient to change the first light retardation to a second light retardation, different from the first light retardation, in the area of exposure. The method may be carried out such that the second light retardation is greater than the first light retardation.

In some cases, a non-exposed area (untreated area) of the retarder film, having the first light retardation, may be a window film, and the exposed area (treated area) of the retarder film, having the second light retardation, may be a c-plate retarder. In some cases, a non-exposed area of the retarder film, having the first light retardation, may be a window film, and the exposed area of the retarder film, having the second light retardation, may be an a-plate retarder.

In some cases, the first light retardation may be an insignificant retardation for visible light, e.g., less than 20 nm over a wavelength range from 380 to 780 nm, and the second light retardation may be a significant retardation for visible light, e.g., at least 95 nm over the 380 to 780 nm wavelength range. The second light retardation may correspond to a quarter wave plate for at least one wavelength in the 380 to 780 nm wavelength range. The second light retardation may correspond to a half wave plate for at least one wavelength in the 380 to 780 nm wavelength range.

The exposing step may be carried out to provide indicia defined by one or more first areas having the first light retardation and one or more second areas having the second light retardation. The method may include attaching the retarder film to a security document. The method may include, after the exposing step, inspecting the retarder film using at least one polarizer.

The effective medium stack may include the first ultrathin layers alternating with the second ultrathin layers. The second polymer material may in some cases be isotropic, but in some cases it may exhibit a second intrinsic birefringence different from the first intrinsic birefringence, and the first and second polymer materials may have different melting temperatures. In such a case, the exposing step may be carried out to preferentially reduce intrinsic birefringence in the first ultrathin layers rather than in the second ultrathin layers. Furthermore, a second exposing step may be carried out in one or more second areas or zones of the film. In the second exposing step, the second area of the film may be exposed to a second radiant beam, the second radiant beam being effective to substantially reduce intrinsic birefringence in both the first ultrathin layers and the second ultrathin layers to provide a third light retardation different from the first and second light retardations. Consequently, the retarder film may exhibit three distinct light retardations in different areas or zones thereof—a first light retardation in untreated areas of the film, a second light retardation in areas of the film treated with the first radiant beam, and a third light retardation in areas of the film treated with the second radiant beam—so as to form a suitable indicia or pattern.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
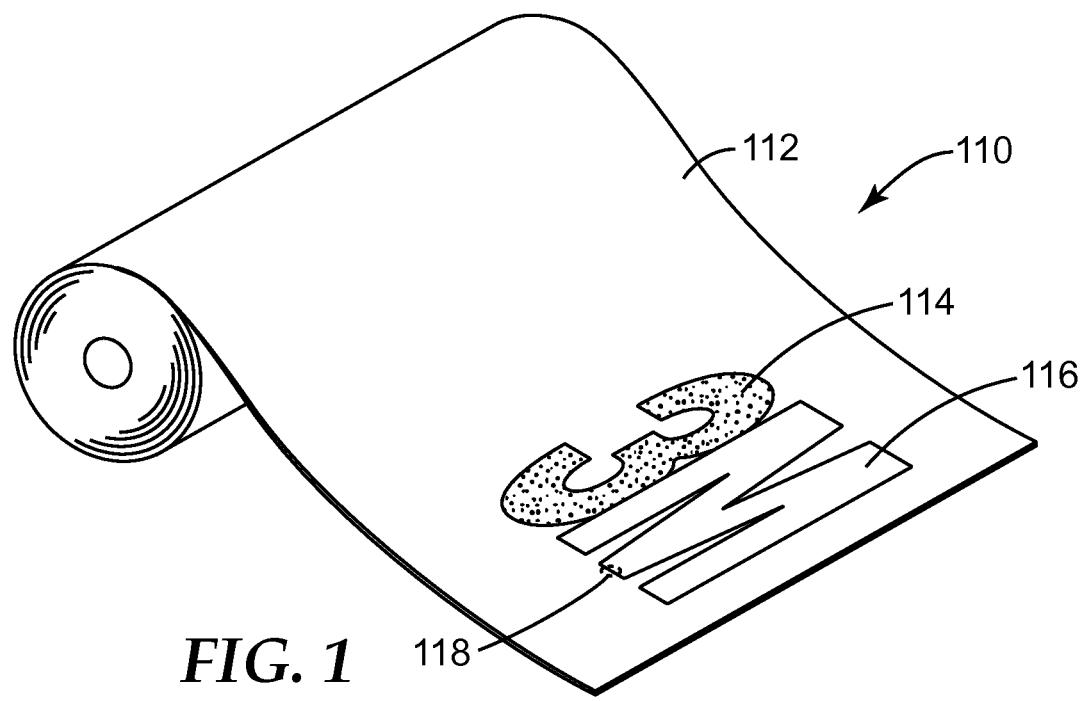
FIG. 1 is a perspective view of a roll of optical retarder film that has been patterned in different areas or zones to provide different optical characteristics in such areas to form indicia.

In at least some disclosed embodiments, the patterning techniques discussed herein can make use of patterning techniques that do not rely on a selective thinning of the film to accomplish the patterning. For example, internal patterning techniques may be utilized, in which an optical retarding film is selectively heated in at least one area or zone by exposing the film to suitable directed radiation, without any selective application of pressure, in such a way that birefringence of at least one material within the film is reduced or eliminated in the selected area or zone but not in a neighboring area or zone, while substantially maintaining the physical integrity of the film in the selected (treated) zone, so as to change an optical retardation of the film (and/or another optical characteristic of the film) in the selected zone relative to the neighboring zone. The various treated and untreated zones of the film may have substantially the same overall film thickness, or at any rate the difference in optical retardation between the different zones may not be substantially attributable to any differences in film thickness between the zones. Furthermore, any difference in optical retardation between the different zones is preferably not substantially attributable to any differences in surface texture, roughness, or other surface effects of the film. Reference is made to the following patent documents: Patent Application Publication US 2011/0249334 (Merrill et al.), "Internally Patterned Multilayer Optical Films With Multiple Birefringent Layers"; Patent Application Publication US 2011/0255163 (Merrill et al.), "Internally Patterned Multilayer Optical Films Using Spatially Selective Birefringence Reduction"; U.S. provisional patent application 61/360,127, "Retarder Film Combinations With Spatially Selective Birefringence Reduction", filed Jun. 30, 2010; and international patent application PCT/US2011/042364, "Retarder Film Combinations With Spatially Selective Birefringence Reduction", filed Jun. 29, 2011.

In the description that follows, we describe transparent optical films that function as retarder plates for visible light, and that incorporate an effective medium stack of contiguous ultrathin layers in order to provide the desired type and amount of retardation for the optical film. These optical films are also configured to be pattern-wise treated, or have been pattern-wise treated, such that the original retardation of the film is modified in the treated areas, the treated and untreated areas together forming indicia or other desired patterns of differing retardation. These indicia or patterns may be made visible to the naked eye by observing the film using polarized light. Without wishing to be bound by theory, the mechanism chiefly responsible for the modified retardation in the treated areas is believed to be a heat-induced relaxation of an intrinsic birefringence of at least some of the ultrathin layers in the effective medium stack. Intrinsic birefringence in this regard refers to the birefringence of a particular specified optical substance, considered in isolation, that is present in the optical film. In order to describe the construction, treatment, and operation of the exemplary optical films, we make reference to other optical concepts such as birefringence, form birefringence, refractive index, effective refractive index, dielectric constants, and optical retardation, which will now be discussed further.

A material may be considered to be "birefringent" if the material has an anisotropic dielectric tensor over a wavelength range of interest, e.g., a selected wavelength or band in the visible portion of the spectrum. Stated differently, a material may be considered to be "birefringent" if the principal refractive indices of the material (e.g., n1x, n1y, n1z) are not all the same. A principal birefringence is the difference between two principal refractive indices. The "birefringence" of a given material or layer may then refer to the difference between its maximum principal refractive index and its minimum principal refractive index, unless otherwise indicated. Negligible amounts of birefringence can generally be ignored. In the context of a retarder film, the amount of birefringence that may be considered negligible may depend on the aggregate thickness or optical path length for light propagating through such material: the smaller the aggregate thickness or path length, the larger the birefringence can be and still be considered negligible, and vice versa.

A principal retardation of a medium is a principal birefringence multiplied by the thickness of the medium. Retardation, like birefringence, is a signed quantity, and the summation of individual retardations of individual components of an optical film or body can cancel or reinforce one another; however, for simplicity, the absolute value or magnitude of the retardation is generally used when values are reported herein, unless the sign or polarity of the retardation is important in the context of the discussion. Retarder plates designed to operate in the visible spectrum have principal retardations that typically range from 50 nm to 800 nm, more typically between 95 nm and 390 nm. When various media are stacked so that their respective principal optical axes substantially coincide, the retardation of the combination is the sum of the retardations of the individual media. Depending on the application, principal axes may be considered to substantially coincide if the maximum angular divergence between corresponding principal axes is 10 degrees, 5 degrees, or 3 degrees or less. For example, a film construction in which a coextruded stack of ultra-thin layers is disposed between two outer skin layers has a total retardation equal to the sum of the retardations of the two outer skin layers and the retardation of the ultra-thin layer stack. If the film construction includes other internal layers, such as protective boundary layers (PBLs), these additional layers can also contribute to the overall retardation of the optical film. In contrast to the individual ultra-thin layers in the stack, the skin layers and PBL layers are each generally optically thick, e.g., each has an optical thickness greater than a wavelength of visible light. In some cases, it may be advantageous to use substantially isotropic materials for the skin layers and/or PBL layers when making a coextruded stack of interior ultra-thin layers, such that the light retardation of the film is substantially equal to the light retardation of the stack of ultrathin layers. In other cases, the optically thick skin and/or PBL layers may also provide significant retardation, contributing to the overall performance of the film.

As described elsewhere herein, a retarder plate or film can be said to be uniaxial when exactly two of the three principal refractive indices are substantially equal. The two axes associated with the two equal refractive indices are referred to as ordinary axes, and they define a plane in which the optical properties are isotropic. The remaining axis, associated with the principal refractive index component that is different from the other two, is referred to as the extraordinary axis. Uniaxial retarders thus possess two substantially equal, non-zero birefringences with their associated retardations between the extraordinary and ordinary axes. The birefringence in the ordinary plane is substantially zero. An a-plate retarder is a uniaxial retarder with the extraordinary axis in the film plane. For such a retarder, the in-plane retardation is the only non-negligible retardation. A c-plate retarder, on the other hand, is a uniaxial retarder with the extraordinary axes perpendicular to the film plane. For such a retarder, the out-of-plane retardation (see the parameter $R_{th}$ below) is the only non-negligible retardation.

Quarter-wave plates, half-wave plates, and the like, may be a-plates or biaxial retarders. A half-wave plate has a principal in-plane retardation equal to one-half of the vacuum wavelength of interest, and a quarter-wave plate has a principal in-plane retardation equal to one-fourth of the vacuum wavelength of interest. Thus, for example, for visible red light having a vacuum wavelength of 632 nm, a half-wave plate has a retardation of about 316 nm, and a quarter wave plate has a retardation of about 158 nm. For visible light having a vacuum wavelength of 560 nm, a half-wave plate has a retardation of about 280 nm, and a quarter wave plate has a retardation of about 140 nm.

Materials are sometimes characterized as "positive" or "negative" birefringent materials. The terms "positive" and "negative" in this regard may have double meanings depending upon whether the context of the discussion relates to a materials processing perspective or to a static functional perspective.

From a materials processing perspective, a material, such as a polymer material, may be said to be positively birefringent if the refractive index of the material increases in the direction of stretching. Since stretching normally occurs in the plane of the film, the refractive index of such a material in the z- or thickness direction typically decreases during such stretching. Similarly, a material may be said to be negatively birefringent if, from a materials processing perspective, the refractive index of the material decreases in the direction of stretching. The refractive index in the z- or thickness direction of such a material typically increases during such stretching. A uniaxially drawn material may exhibit uniaxial symmetry in the dielectric tensor, with two equal or substantially equal principal indices of refraction when the film is drawn truly uniaxially. In this case, the in-plane direction aligned along the principal stretch direction becomes the extraordinary axis of the dielectric tensor, and the orthogonal in-plane direction and the thickness direction (z-axis) become the equal, ordinary axes of the dielectric tensor. Truly uniaxial drawing can be achieved by allowing the film or material to dimensionally contract in the orthogonal in-plane direction (i.e., the in-plane direction that is perpendicular to the stretch direction) similarly to the thickness direction as the dimension of the material along the principal axis of stretching is increased, e.g. as described in U.S. Pat. No. 6,939,499 (Merrill et al.), U.S. Pat. No. 6,949,212 (Merrill et al.), Patent Application Publication US 2008/0083998 (Merrill et al.), and Patent Application Publication US 2008/0085383 (Merrill et al.). A truly uniaxially drawn film may form an a-plate (uniaxial) retardation film. In some cases, however, a uniaxially stretched material can be constrained from dimensional contraction, e.g. in a convention tenter or using a length orienter, which can result in three different values for the principal refractive indices, thus producing a biaxial retarder. Either one of a biaxial retarder or a uniaxial a-plate may be used to make a quarter- or half-wave plate. In some cases, a material or film that is biaxially drawn, whether sequentially or simultaneously, may exhibit uniaxial symmetry in the dielectric tensor, whereby the final in-plane principal refractive indices are equal or nearly equal. In this case, the thickness direction or z-axis becomes the extraordinary axis, and the film is a c-plate uniaxial retardation film. In some cases the biaxial stretching in the plane of the film may not be balanced, e.g., the film can be stretched more in the x-direction than in the y-direction, or vice versa, which can result again in three substantially different values for the principal refractive indices. Such a film may thus be a biaxial retarder. Such asymmetric biaxial drawing can also be used to make quarter-wave and half-wave plates, for example.

From a static functional perspective, a uniaxial retarder may be said to be positively birefringent if the index of refraction associated with the extraordinary axis is greater than the index of refraction associated with the ordinary axes. Thus, a positive c-plate may be formed by equally biaxially orienting a negatively birefringent material, and a negative c-plate plate may be formed by equally biaxially orienting a positively birefringent material. Similarly, a positive a-plate may be formed by truly uniaxially orienting a positively birefringent material, and a negative a-plate may be formed by truly uniaxially orienting a negatively birefringent material.

As mentioned above, when light encounters a layered medium whose individual layers are all less than a given fraction of the wavelength of the light, the light propagates through the layered medium or stack as if it were a non-layered medium or "effective medium". The layers in the stack are typically arranged in a repeating pattern, e.g., an alternating ABABAB . . . arrangement of "A" layers composed of one material and "B" layers composed of a different material, although other repeat patterns can be used. The smallest group of layers that forms the basis of the pattern is referred to as an optical repeat unit; in the case of the simple ABABAB . . . stack, a single AB pair is the optical repeat unit. The "effective medium" condition can be in terms of the optical thickness of the optical repeat unit: the optical thickness of each optical repeat unit in the stack is less than half the wavelength of the light. For visible light, e.g., light within the wavelength range from about 380 to 780 nm, this "effective medium" condition can be expressed as the optical thickness of each optical repeat unit is less than 190 nm. We refer to layers in a stack that satisfy this condition as ultrathin layers. If these layers are of uniform optical thickness, then the optical thickness of each layer is less than 95 nm.

The refractive indices of an effective medium, which can be approximated using effective medium theory, are referred to herein as effective refractive indices. Even though the effective medium is made up of distinct layers of different optical materials with different indices of refraction, the layer stack as a whole behaves with respect to retardation as if it had a single set of effective refractive indices as would be calculated in the effective medium limit. In this limit, the in-plane refractive indices are a weighted compositional average according to a series model for the dielectric constant, while the plane normal refractive index are a weighted compositional average according to a parallel model for the dielectric constant. The dielectric constant "E" of a material is related to the refractive index "n" of the material by the relationship $E=n^2$. Since E is a tensor quantity, equations for the dielectric constant may be written for the three principal directions. When the dielectric tensor is written in this diagonal or principal form, the indices of refraction in these principal directions may be derived as the square-roots of the principal dielectric values. By assuming "x" and "y" are the principal directions in the film plane and "z" is the principal direction orthogonal to the film plane, effective medium theory provides the following equations for the effective dielectric constant:

$$E_x = f_1 \cdot E_{1x} + f_2 \cdot E_{2x} \tag{1}$$

$$E_y = f_1 \cdot E_{1y} + f_2 \cdot E_{2y} \tag{2}$$

$$E_z = ((f_1/E_{1z}) + (f_2/E_{2z}))^{-1} \tag{3}$$

Here, E is the dielectric constant of the effective medium, having values of $E_x$, $E_y$, and $E_z$ along the x, y, and z axes respectively. Similarly, $E_{1x}$, $E_{1y}$, and $E_{1z}$ are the x, y, z components of the dielectric constant for layers composed of material "1", and $E_{2x}$, $E_{2y}$, and $E_{2z}$ are the x, y, z components of the dielectric constant for layers composed of material "2". These equations assume the effective medium consists essentially of alternating layers of materials "1" and "2". If a given material "i" (i=1 or 2) is isotropic, then the component principal dielectric constants $E_{ix}$, $E_{iy}$, $E_{iz}$ are all substantially equal. The parameters $f_1$ and $f_2$ in the equations above represent the relative amount or fraction of the two materials on a per thickness basis in the stack or optical repeat unit. These parameters $f_1$ and $f_2$ sum to unity when only layers of these two materials "1" and "2" are present within the stack:

$$f_1 + f_2 = 1 \tag{4}$$

Equations (1) through (4) are in the form of standard generic results for series and parallel averages of properties formed by layers which may in general be anisotropic, as portrayed by effective medium theory.

Counterparts to equations (1) through (3) can be written for the x, y, and z components of the effective refractive index n, based on the relationship $E=n^2$:

$$n_x = \text{sqrt}\{E_x\} = \text{sqrt}\{f_1 \cdot E_{1x} + f_2 \cdot E_{2x}\} \tag{1a}$$

$$n_y = \text{sqrt}\{E_y\} = \text{sqrt}\{f_1 \cdot E_{1y} + f_2 \cdot E_{2y}\} \tag{2a}$$

$$n_z = \text{sqrt}\{E_z\} = \text{sqrt}\{((f_1/E_{1z}) + (f_2/E_{2z}))^{-1}\} \tag{3a}$$

Here, "sqrt" refers to the square root function.

Although equations (1) through (4) assume the stack consists essentially of alternating material layers "1" and "2", they can be readily extended to accommodate other stack configurations, e.g., where three or more different material layers make up each optical repeat unit. For example, layers of two different, positively birefringent materials may be averaged together using equations (1) and (2) and this effective result averaged again with a third, negatively birefringent material. Alternatively, the equations can simply be extended with fractions $f_1$, $f_2$, $f_3$ and so forth, using a series average in-plane in accordance with the pattern of equations (1) and (2) and using the parallel average through the thickness in accordance with the pattern of equation (3). Thus, for example, where the stack is composed of a repeating pattern of material layers "1", "2", and "3", equation (4) becomes $f_1 + f_2 + f_3 = 1$, equation (1) becomes $E_x = f_1 \cdot E_{1x} + f_2 \cdot E_{2x} + f_3 \cdot E_{3x}$, and equation (3) becomes $E_z = ((f_1/E_{1z}) + (f_2/E_{2z}) + (f_3/E_{3z}))^{-1}$.

A given optical article, or layer or other portion thereof, can have three principal retardations, corresponding to the three principal birefringences: the in-plane retardation, which is associated with the in-plane (x,y) birefringence, and two out-of-plane retardations, which are associated with the two out-of-plane (x,z and y,z) birefringences. A convenient reference quantity or parameter for a retarder plate, particularly when the retarder plate is biaxial in character but also applicable in other cases, is the absolute value of the average out-of-plane (or thickness) birefringence, which we label $N_{th}$:

$$N_{th} = ((n_x + n_y)/2) - n_z \tag{5a}$$

The retardation associated with this average out-of-plane birefringence, which we label $R_{th}$, is given by:

$$R_{th} = D_{th} \cdot |N_{th}|, \tag{5b}$$

where $D_{th}$ is the actual thickness of the retarding medium of the given refractive indices.

Certain quantities and parameters discussed herein may be considered to be negligible in many or most applications. For example, a small but nonzero amount of retardation may be considered to be substantially zero. Also, a small but nonzero amount of birefringence may be considered to be substantially zero. Further, an effective medium may possess a small but nonzero amount of form birefringence, which may nevertheless be considered to be substantially zero.

With regard to retardation, in applications involving visible light, a principal retardation may typically be considered to be negligible, i.e. substantially zero, if its magnitude or absolute value is 10 nm or less. In some applications, even higher values, such as 15, 20, 30, or even 50 nm, may be considered negligible.

With regard to birefringence, a birefringence may typically be considered to be negligible, i.e. substantially zero (meaning also that the principal refractive indices associated with the birefringence may be considered to be substantially equal to each other), if the corresponding retardation for a given thickness of the material is negligible. The reader is reminded that, because the refractive index of materials may exhibit dispersion, i.e., the refractive index may be different at different wavelengths, the retardation can also be different at different wavelengths. In some cases, this effect is small and can be ignored, particularly over most or all of the visible spectrum from about 380 to 780 nm. Nevertheless, if the birefringence satisfies the condition above—that the corresponding retardation for the given thickness of the material is negligible—at one or more particular visible wavelengths, or, in some cases, over most or all of the visible wavelength band, then the birefringence may be considered to be negligible at such wavelength(s), depending on the requirements of the application.

With regard to form birefringence, we first need to quantify what is meant by form birefringence in the context of a layered effective medium. Form birefringence refers to an optical anisotropy that results from a material structure that is larger than the molecular distance scale and smaller than the wavelength of light. For example, a nano-phase structure with regular periodicity possesses form birefringence. In the case of a simple layered medium such as the effective medium stack of contiguous ultrathin layers shown and described elsewhere herein, form birefringence has an effect only on the effective dielectric constant in the thickness direction, $E_z$ (and on the corresponding effective refractive index in the thickness direction, $n_z$), and not on the x- and y-components of the effective dielectric constant and the effective refractive index. In the absence of form birefringence, the form of the equation for the z-component of the effective dielectric constant E of the effective medium, in the case where the effective medium is composed of alternating ultrathin layers of only the material "1" and the material "2", would be the same as the weighted averages form of equations (1) and (2) above. That is, in the absence of form birefringence, the z-component of the effective dielectric constant of the effective medium would be a baseline value given by:

$$E_{z,baseline} = f_1 \cdot E_{1z} + f_2 \cdot E_{2z} \tag{6}$$

The baseline value of the z-component of the corresponding effective refractive index of the effective medium would then be given by:

$$n_{z,baseline} = \mathrm{sqrt}\{E_{z,baseline}\} \mathrm{sqrt}\{f_1 \cdot E_{1z} + f_2 \cdot E_{2z}\} \tag{6a}$$

The effect of form birefringence can thus be quantified by calculating the difference between the actual effective dielectric constant in the z-direction, according to equation (3), and the baseline value of equation (6):

$$\Delta E_{z,form} = E_z - E_{z,baseline}, \tag{7a}$$

which can be simplified to:

$$\Delta E_{z,form} = -(f_1 \cdot f_2 \cdot (E_{2z} - E_{1z})^2)/(f_1 \cdot E_{2z} + f_2 \cdot E_{1z}) \tag{7b}$$

Here, the term $\Delta E_{z,form}$ represents the form birefringence portion of the effective dielectric constant (in the z-direction) of the effective medium. Note that the form birefringence has the effect of reducing the actual effective dielectric constant (in the z-direction) below the result that would be obtained by using the simple average provided in the baseline calculation of equation (6). An analogous term $\Delta n_{z,form}$, representing the form birefringence portion of the effective refractive index (in the z-direction) of the effective medium, is given by:

$$\Delta n_{z,form} = n_z - n_{z,baseline}, \tag{8a}$$

where the term $n_z$ is the effective refractive index in the z-direction according to equation (3a), and $n_{z,baseline}$ is given by equation (6a). Equation (8a) can be rewritten as:

$$\Delta n_{z,form} = \Delta E_{z,form}/(\mathrm{sqrt}\{E_z\} + \mathrm{sqrt}\{E_{z,baseline}\}) \tag{8b}$$

We may now define a parameter $R_{form}$, which is the retardation associated with the form birefringence:

$$R_{form} = D_{th} \cdot |\Delta n_{z,form}|, \tag{9}$$

where $D_{th}$ is again the actual thickness of the retarding medium just as in equation (5b). With this background, we may conclude that the form birefringence may be considered to be negligible, in applications involving visible light, if either one of the following conditions is satisfied:

$$R_{form} < R_{threshold}, \tag{10a}$$

or $$R_{form} < 0.05 \cdot R_{th} \tag{10b}$$

The parameter $R_{threshold}$ is typically 10 nm, but in some applications it may be more, e.g., 15, 20, 30, or even 50 nm. The parameter $R_{th}$ in equation (10b) is provided above in equation (5b). For design purposes, equation (6) may be used to calculate the z-component of the effective dielectric constant of the effective medium rather than equation (3), when form birefringence is negligible.

Turning now to FIG. 1, we see there an spatially tailored optical film (STOF) 110 that has been patterned or spatially tailored using spatially selective birefringence reduction of at least some of the constituent films or layers (not shown in FIG. 1) of the film 110. The patterning defines distinct zones 112, 114, 116 that are shaped so as to form the indicia "3M" as shown, although any other patterns, whether regular or irregular, repeating or non-repeating, can be produced. The film 110 is shown as a long flexible material wound into a roll because the methodology described herein is advantageously compatible with high volume roll-to-roll processes. However, the methodology is not limited to flexible roll goods and can be practiced on small piece parts or samples as well as non-flexible films and articles.

The "3M" indicia is detectable, with the assistance of other optical components or devices, because the different zones 112, 114, 116 have different optical characteristics, in particular, they have different optical retardations. Zone 112 has a first light retardation, zone 114 has a second light retardation different from the first light retardation, and zone 116 has a third light retardation. The third light retardation may be the different from the first and second retardations, or it may be substantially the same as the second retardation. At any specified location or zone on the film 110, these optical or light retardations may be made up of the retardations of the constituent components of the film 110, such as that of one or more interior effective medium stacks of contiguous ultrathin layers, and optionally also that of one or more optically thick skin layers and/or PBL layers as discussed elsewhere herein.

In some cases, the film 110 may provide only a patterned retardation with little or no reflectivity or absorption over the visible spectrum. In such a case the film 110 may appear to be a substantially uniform (unpatterned) window film to the unaided eye of a human observer. "Window film" in this regard refers to a film that is substantially transparent, clear, and isotropic in refractive index (including effective refractive index). The patterned retardation may however be made visible to such observer by placing the film 110 between crossed polarizers, for example. In some cases, reflectivity and/or absorption may be provided by one or more blocking layers at wavelengths outside of the visible spectrum, e.g., at infrared wavelengths.

In exemplary cases, the film 110 is at least partially light transmissive, and preferably has a transmission over some or all of the visible spectrum of at least 50, 60, 70, or 80% or more. In general, transmission (T) plus reflection (R) plus absorption (A)=100%, or T+R+A=100%. In cases where the film includes diffusing particles or surfaces, the transmission T may represent the hemispheric transmission, i.e., all light that exits the film on a side of the film opposite the light source, regardless of its propagation direction within a solid angle of $2\pi$, and R may likewise represent the hemispheric reflection, i.e., all light that exits the film on the same side of the film as the light source, regardless of its propagation direction within a complementary $2\pi$ solid angle. In some embodiments the film is composed entirely of materials that have low absorption over at least a portion of the wavelength spectrum. This may be the case even for films that incorporate an absorbing dye or pigment to promote heat delivery, since some absorbing materials are wavelength specific in their absorptivity. For example, infrared dyes are available that selectively absorb in the near-infrared wavelength region but that have very little absorption in the visible spectrum. At the other end of the spectrum, many polymer materials that are considered to be low loss in the optical film literature do have low loss over the visible spectrum but also have significant absorption at certain ultraviolet wavelengths. Thus, in many cases the film 110 may have an absorption that is small or negligible over at least a limited portion of the wavelength spectrum, such as the visible spectrum, in which case the reflection and transmission over that limited range take on a complementary relationship because T+R=100%−A, and since A is small, $$T+R\approx 100\%.$$

As mentioned elsewhere herein, the different optical retardations of the disclosed optical articles (e.g. film 110) in the different patterned zones (e.g. zones 112, 114, 116) are each the result of structural features, such as an effective medium stack of ultrathin, and optionally bulk material (such as that of skin layers and/or PBL layers) that are internal to the optical film, rather than the result of coatings applied to the surface of the film or other surface features. This aspect of the disclosed films makes them advantageous for security applications (e.g. where the film is intended for application to a product, package, or document as an indicator of authenticity) because the interior features are difficult to copy or counterfeit.

The first, second, and third optical retardations differ from each other in a way that is perceptible under at least some viewing conditions to permit detection of the pattern by an observer or by a machine, as described further below. The differences are preferably attributable primarily to differences in the refractive index properties of interior features of the optical film in the different neighboring zones of the film, and are not primarily attributable to differences in thickness between the neighboring zones, nor to surface-related features.

Figure 2:
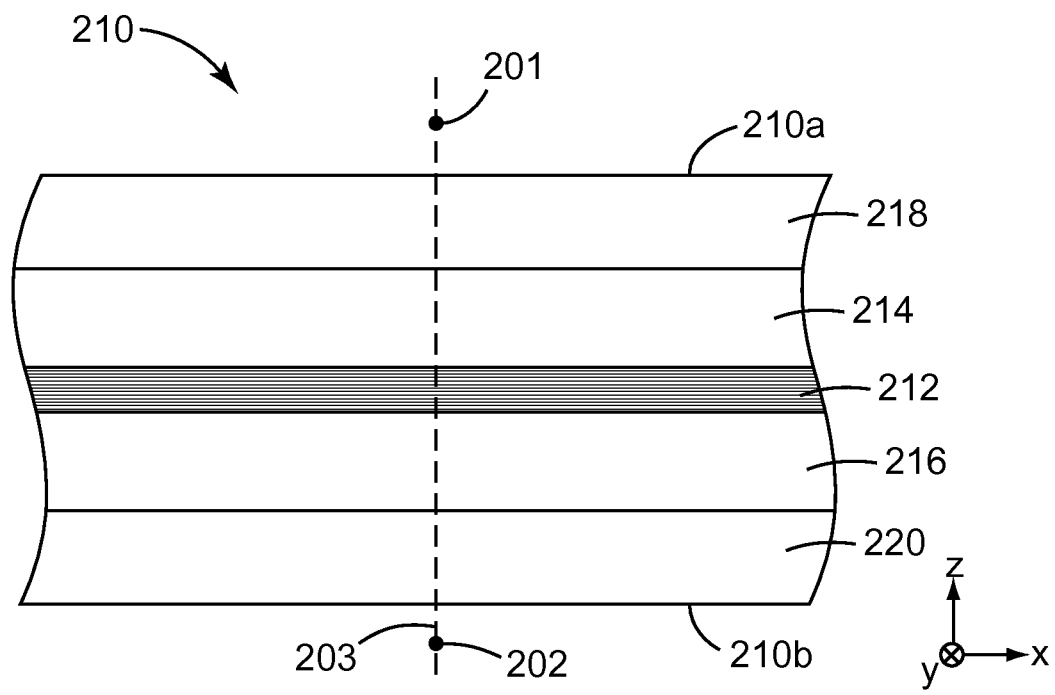
FIG. 2 is a schematic side or sectional view of a portion of an exemplary retarder film.

FIG. 2 is a schematic side or sectional view of a portion of a spatially tailored (or tailorable) optical film (STOF) 210. The film 210 has a front or top surface 210a and a back or bottom surface 210b as shown. The film 210, which is shown in the context of a Cartesian x y z coordinate system, with the x- and y-axes defining a plane of the film and the z-axis oriented parallel to a thickness axis of the film, includes a retarder layer 212, which may also be referred to herein as retarder stack, disposed between protective boundary layers (PBL) 214, 216, which in turn are disposed between outer skin layers 218, 220. These components are connected to each other in a layered arrangement preferably using coextrusion and orientation techniques as discussed elsewhere herein, and optionally in combination with other suitable techniques such as lamination or coating techniques, to produce the film 210 as shown. The film 210 typically has a relatively limited thickness in the z-direction, and typically extends along in-plane x- and y-directions. The film 210 is typically thin enough to be flexible, although embodiments that are thick and substantially rigid are also contemplated. Spatial patterning of the film 210 is defined generally along the x-y plane.

The retarder layer 212 is shaded gray to represent that it is an effective medium stack of contiguous ultrathin layers configured to provide an effective optical medium for visible light, as discussed elsewhere herein. The film 210 can be characterized in terms of its optical retardation as a function of position in the plane of the film. An axis 203 is drawn to represent one such position. Light propagating along the axis 203, e.g. from an external point 201 to an external point 202 or vice versa, in general experiences a retardation between two constituent orthogonal polarization components of the light. In some cases, e.g. when the PBL layers and skin layers are isotropic, or when the PBL and/or skin layers individually have significant retardations but are mutually oriented to substantially cancel their individual retardations, the retardation of the film 210 may be due substantially entirely to the retarder layer 212. In other cases, the retardation of the film 210 may be a combination of the retardation of the retarder layer 212 and that of the PBL and/or skin layers.

The basic construction of the embodiment of FIG. 2 is that of a coextruded and oriented multilayer STOF comprising the two outer skin layers 218, 220, the two inner PBLs 214, 216, and an inner core which is the retarder layer 212. During film fabrication, the inner PBLs may be co-extruded as the outer layers of the core in a multilayer feedblock, and hence are situated between the core and the outermost skin layers. In some cases, the outermost skin layers 218, 220 may be omitted. The core, i.e., retarder layer 212, comprises or consists essentially of at least two sets of alternating material layers. The core includes or consists essentially of at least one packet or stack of such alternating layers. When packet multiplication is used in the co-extrusion process, the fundamental optical core layers exiting the feedblock are cut and re-stacked, to form additional packets. The film 210 may then comprise a plurality of such packets or stacks, separated from each other by optically thick PBL(s). In some cases, multiple packets can be included in the optical film by merging separate packets made from separate feedblocks. In any case, the film construction typically includes skin layers and at least one packet, each packet separated from the skin layers or other packets by protective boundary layers.

During film fabrication, after coextrusion and casting, the cast material is typically oriented by stretching to create intrinsic birefringence in at least one of the sets of layers in at least one packet of the film. In addition to creating birefringence, the orientation procedure also increases the length and/or width, and decreases the thickness, of the construction, so that the finished film 210 and its constituent elements are of the desired thicknesses. After orientation, at least one packet of the film comprises layers sufficiently thin to form an effective medium suitable to function as the retarder layer 212, with an effective anisotropic set of refractive indices represented by two in-plane and one out-of-plane principal index of refraction as measured at one or more design wavelengths, such as the visible wavelength range or any wavelength therein. Wavelengths discussed herein are in referenced to the wavelength in a vacuum. Each principal refractive index likewise has a dispersion curve, i.e. the principal refractive indices are each functions of wavelength, typically monotonically decreasing with increasing wavelength. These dispersion curves may be approximated by standard functions, e.g. by the so-called Cauchy relation fit to at least three measured wavelengths over the band of interest. In practice, indices of refraction may be measured using a variety of devices including an Abbe refractometer and a prism coupler (e.g. as available from Metricon Corporation, Piscataway, N.J.). In order to function substantially as an effective medium for visible light, the optical thickness of the individual ultrathin layers in the packet, or of optical repeat units of such layers in the packet, must be sufficiently small as discussed elsewhere herein. For example, the individual layer optical thicknesses are preferably less than one-quarter of the wavelength of the shortest wavelength of the desired wavelength band. The optical thickness is the product of the refractive index of the layer and the physical thickness of the layer. For the visible band, e.g. 380 to 780 nm, the optical thickness of the thickest core layer in the effective medium stack (thus including the ultrathin layers but excluding PBLs) is preferably less than 95 or 100 nm. It may be desirable to be even thinner, e.g., an optical thickness less than 50 nm. The refractive indices of highly oriented polyester materials, which may be used in the effective medium stack, can be slightly more than 2 or at least 1.5 for short wavelengths within the visible band. The physical thicknesses of individual ultrathin layers may therefore be no more than about 70 nm and in some cases no more than 50 or 25 nm or less. A packet made up of such ultra-thin layers can thus form an effective medium and, unlike typical multilayer optical film polarizers and mirrors, can provide, for substantially all visible wavelengths and regardless of polarization state, substantially no significant reflection bands associated with constructive or destructive light interference, which would otherwise alter the transmission of visible light through the film.

The refractive index properties of the effective medium core (retarder layer 212), the protective boundary layers 214, 216, and the skin layers 218, 220 may together provide the overall retardation for light incident on the film 210 at any given angle of incidence. As discussed elsewhere herein, the retardation is the optical path length difference between two orthogonal polarization states of the light transmitted through the film, typically given in nanometers. The fast axis of the retardation plate is in the direction of lowest in-plane refractive index, and the slow axis is perpendicular to it, in the direction of the highest in-plane refractive index. For normally incident light, the retardation is the sum of the differences of the in-plane principal indices of refraction for that wavelength (i.e., the in-plane birefringence) times the physical thicknesses of the various layers (e.g. the skin layers, PBLs, and core packet(s)). When the retardation is equal to one-half the given wavelength, the film 210 or portion thereof is said to be a half-wave plate. For example, vertically linearly polarized light that enters a half-wave plate aligned diagonally with its fast and slow axes at 45 degrees to the polarizer axes exits the half-wave plate as horizontally linearly polarized light. The effectiveness of a retardation plate can also be measured directly via transmission measurements of a sandwich construction in which the retardation plate is disposed between a front and back polarizer, using for example a conventional spectrophotometer. For a given wavelength, a film acts as a half-wave (or higher order) plate when there is little or no transmission through the sandwich construction when the front and back polarizers have aligned pass-state axes, and when there is high transmission through the sandwich construction when the front and back polarizers have perpendicular pass-state axes, and provided the fast and slow axes of the retardation film are oriented at 45 degrees relative to the polarizer axes.

In order to selectively treat the optical film 210 in selected areas such that it can exhibit different optical retardations at different (x,y) positions so as to form indicia or other in-plane patterns, the retarder layer 212 is provided with an absorption characteristic in one or more of its constituent layers, the absorption characteristic preferably extending continuously throughout the x,y plane so that any desired position or area of the film 210 can be treated. The absorption characteristic is preferably the result of an absorbing agent such as a dye or pigment incorporated into one or more constituent layers of the retarder layer 212, but in some cases may result from the intrinsic or native absorption of a given polymer material used in the effective medium stack. The absorption characteristic is tailored to absorptively heat the effective medium stack, when the optical film 210 is exposed to a suitable radiant beam such as a laser. The absorptive heating, which can be substantially localized to the area or zone of the film exposed to the beam, is sufficient to change the light retardation in the exposed area of the film to a different light retardation, while maintaining a structural integrity of the effective medium stack. The radiant beam may impinge on the top surface 210a or the bottom surface 210b of the film 210, as desired. The radiant beam may be polarized or collimated or both, e.g. from a laser source. The radiant beam comprises a write wavelength, e.g., a wavelength bandwidth.

The absorptive heating is effective to pattern the optical film 210 by modifying the birefringence and retardation of the retarder layer 212. This in turn is facilitated by designing the effective medium stack of the retarder layer 212 such that at least some of the constituent ultrathin layers have an intrinsic birefringence, such intrinsic birefringence provided e.g. by the film orientation procedure. The absorptive heating can be high enough to relax the intrinsic birefringence of at least some of the ultrathin layers, but low enough to maintain the structural integrity of the effective medium stack. Thus, the retarder layer 212 may be tailored to be selectively absorptive to a chosen wavelength, typically in the range 350 nm-2500 nm, and thus susceptible to birefringence reduction through the application of such radiant energy. Although intrinsic absorption of one or more of the constituent optical materials may be used, typically a radiant absorbing agent such as a dye or pigment is co-extruded in at least one set of polymer layers that form the effective medium packet. Exemplary absorbing agents may thus be melt extrudable so that they can be embedded into a selected layer set of interest. To this end, the absorbers are preferably reasonably stable at the processing temperatures and residence times required for extrusion. Examples of suitable radiant absorbers include organo-metallic compounds such as Epolite™ 4121 (available from Epolin, Newark, N.J.) or Amaplast™ IR-1050 (available from Color Chem International Corp., Atlanta, Ga.), metal salts, metal oxides such as antimony tin oxide (ATO), and engineered particles, e.g. particles exhibiting size-specific plasmon resonance absorption such as those made from lanthanum hexaboride ($LaB_6$). Some potential infrared dyes include any of the nickel, palladium, and platinum-based dyes available from Epolin, Inc. under the tradename Epolight™. Other suitable candidates can be found in U.S. Pat. No. 6,207,260 (Wheatley et al.) "Multicomponent Optical Body".

In some cases the absorbing agent may be a non-linear absorber, i.e., it may be or comprise a composition in which the light energy absorption coefficient is intensity or fluence dependent, where intensity refers to energy per unit area per unit time, and fluence refers to energy density or energy per unit area. Nonlinear light absorbers may be of the two-photon absorption type or the reverse saturable absorption type, for example.

The two-photon absorption process is a nonlinear light absorption process in which the photon energy is approximately equal to half the energy required for linear excitation of the material. Excitation of the absorbing material therefore requires the simultaneous absorption of two of the lower energy photons. Examples of useful two-photon absorbers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride and the hexafluoroantimonate salt of Rhodamine B) and the four classes of photosensitizers described, for example, in PCT Publications WO 98/21521 (Marder et al.) and WO 99/53242 (Cumptson et al.).

The reverse saturable absorption process is also sometimes referred to as excited state absorption, and is characterized by the absorption cross section for the excited state involved in the absorption process being much larger than the cross section for excitation from the ground state to the excited state. The total light absorption involves both ground state absorption and excited state absorption. Examples of reverse saturable absorption materials include, for example, metallophthalocyanines, naphthalocyanines, cyanines, fullerenes, metal nanoparticles, metal oxide nanoparticles, metal cluster compounds, porphyrins, indanthrone derivatives and oligomers or combinations thereof. Examples of metallophthalocyanines include, for example, copper phthalocyanine (CuPC), and phthalocyanines containing metal or metalloids from group IIIA (Al, Ga, In) and IVA (Si, Ge, Sn, Pb). Examples of naphthalocyanines include, for example, the phthalocyanine derivatives of silicon (SiNC), tin (SnNC), and lead (PbNC). Examples of cyanines include, for example, 1,3,3,1',3',3'-hexamethylindotricarbocyanine iodide (HITCI). Examples of fullerenes include C60 and C70 fullerenes. Examples of metal nanoparticles include gold, silver, aluminum, and zinc nanoparticles. Examples of metal oxide nanoparticles include titanium dioxide, antimony tin oxide, and zirconium dioxide nanoparticles. Examples of metal clusters include iron tricobalt metal clusters such as $HFeCo_3(CO)_{12}$ and $NEt_4FeCO_3(CO)_{12}$. Examples of porphyrins include tetraphenylporphyrin (H2TPP), zinc tetraphenylporphyrin (ZnTPP), and cobalt tetraphenylporphyrin (CoTPP). Examples of indanthrone derivatives include unsubstituted indanthrone, oxidized indanthrone, chloroindanthrone, and an indanthrone oligomer.

The retardation of the effective medium stack (such as retarder layer 212) can be changed by the application of radiant energy of the selected wavelength(s) that the film (e.g., the retarder layer 212) is susceptible to via absorption. General processing considerations are described e.g. in patent application publication US 2011/0255163 (Merrill et al.), "Internally Patterned Multilayer Optical Films Using Spatially Selective Birefringence Reduction". In many cases, the radiant energy source is a laser, often a near infrared laser operating at an output wavelength at or near 800 nm, or at or near 1065 nm. The laser may be operated in a continuous or pulsed mode, and it may be scanned or swept in a path over an area or zone of the film as discussed below in connection with FIGS. 8a-8c. Other laser process conditions that may affect the heat-induced patterning process include beam diameter and focus, power level, scan rate, and sweep pattern. For pulsed lasers, the pulse frequency, the peak pulse power, and the waveform are also considerations. Typically, the heat-induced birefringence reduction occurs only above a certain threshold envelope of conditions. Notable material factors include the heat capacity, melting points, heats of fusion, and level of crystallinity in the initially oriented, birefringent ultrathin layers. The threshold conditions may be or correspond to conditions in which a portion of the material reaches its melting point; the birefringence reduction may thus be the result of at least partial melting of the oriented crystals of the intrinsically birefringent ultrathin material(s).

Reduction in birefringence, also referred to herein as conversion or treatment of the optical film, may also vary through the film thickness (along the z-direction), with centrally disposed ultrathin layers more fully converted, under some processing circumstances, than ultrathin layers disposed near the outer surfaces of the core or effective medium. Such circumstances include the heat transfer and thermal diffusion during and immediately following the radiant processing. Thus, the amount and location of the retardation adjustment may depend not only on radiant processing conditions but also on details of the film construction. Furthermore, sufficiently rapid thermal quenching can ameliorate haze development. The highest temperature reached by the outer skin layers during radiant beam processing can affect the level of or eliminate wrinkling and surface roughening at the outer surfaces 210a, 210b of the film. The relative proportion of absorbing material versus non-absorbing material in the film construction, as well as their relative placement within such construction, can also be significant considerations. For example, layers within the film that have little or no absorption at the process wavelength can act as heat sinks. These heat sink layers can provide thermal isolation for the selectively absorbing effective medium packet(s) relative to other layers in the construction.

Under some processing conditions, thermal diffusion can be significant, and the temperature profile within the core layers may achieve a rounded profile. Gentle processing will convert (i.e., reduce the birefringence of) the layers in the center of the core, but will fail to convert the layers in the outer portions of the core. When the effective medium stack construction includes two different birefringent materials, gentle processing may convert the lower melting point layers in the central region of the core, but fail to convert the lower melting point layers in the outer regions of the core. More aggressive processing may begin to convert both materials in the center of the core and may produce over-heating, while only the lower melting point material may be converted in the outer regions of the core. Thus, the degree of a stepped process window may depend on the composition and geometry of the film layer profile construction. In some cases, it may be advantageous to use thick PBLs, which may be composed of the same higher melting point material as that of one of the sets of ultrathin layers, such thick PBLs also being loaded with the radiant absorbing agent. In this manner, more of the temperature profile rounding can be placed outside of the core, allowing a more robust process window in which most of the low melting point core layers to be converted, while few if any of the higher melting point core layers, are converted and contribute to retardation changes upon processing. In such cases, it may also be advantageous to use isotropic PBLs, so that the retardation of the overall film can be more robustly controlled. In these contexts, additional layers interior to the outer skin layers, and disposed between the outer skin layers and PBLs, may also be used to supplement the radiant absorbing function of the PBLs, or the heat sink, anti-wrinkle and other dimensional stabilization functions of the outer skin layers. Again, it may be advantageous for these additional layers to be isotropic.

One potential advantage of spatially tailorable effective medium stacks disclosed herein is the ability to control or tune the overall retardation provided by the core layers independently of the film thickness. When polymeric films are oriented, good thickness uniformity often requires a certain level of orientation, which can depend on temperature profiles of the film manufacturing line, draw rate profiles, and ultimate draw ratios of the process for the given materials. Moreover, it has been found that drawing multilayer stacks of many thin layers may be practically easier, especially to effectively higher orientation states (e.g. via higher draw ratios) than the same materials monolithically or with stacks of six or fewer (thicker) layers, e.g. as described in U.S. Pat. No. 5,968,666 (Carter et al.). Thinner layers may also convey additional mechanical advantages. For example, thinner layers may be less susceptible to delamination. Furthermore, using an effective medium stack eliminates not only specific interference stack reflections, but also the internal surface reflections of such thicker layers, reducing transmission losses through the film. The relative amount or ratio of the two (or more) materials used in the effective medium stack can be adjusted or controlled so that the amount of effective birefringence in the finished effective medium core is between the amounts one would expect if the stack were composed entirely of either of the individual materials, under similar drawing conditions (in which hypothetical cases the stack would cease to exist and would be replaced with a monolithic material layer). For example, if one material is highly birefringent and the other material is nearly isotropic, a well-drawn film with intermediate effective retardation can be made, and thus also a thicker, more easily handled film can be made for a desired level of retardation.

In practice, the behaviors of the individual materials in an effective medium stack can be estimated by coextruding a bi-layer construction, orienting the film under the desired conditions and measuring the resulting refractive indices on both sides of the bi-layer film, e.g. using a Metricon Prism Coupler. When the ultrathin layers are formed through a co-extrusion process, the constituent layers may be prone to an interfacial mixing, e.g. interdiffusion. In this case, the relative thicknesses (e.g. $f_1$ and $f_2$) may be approximated by the amounts physically delivered of the two materials via the coextrusion process. Minor deviations from the predicted refractive index results may then occur because of small variations of the material behavior in this interfacial region from the pure materials in the center of those ultra-thin layers. Retardation values can be precisely tuned, e.g. by measurement of the actual, resulting retardation and making small adjustments to the relative amounts of the delivered material streams.

The optical film 210, typically after orientation, can be combined or incorporated in a larger construction, e.g. used as a layer in a laminated or otherwise combined construction. For example, the optical film 210 can be heat laminated and/or pressure laminated onto or between additional outer film layer(s). In another example, the adhesive can be applied to the film, and then the film can be adhered, e.g. by pressure and/or heat, to additional outer film layers on one or both sides. Such additional layers may also act as heat-sinks during radiant processing. Thus, for example, additional retarders and/or other layers, coatings, or films (see e.g. U.S. Pat. No. 6,368,699 (Gilbert et al.)) can be attached to the top or bottom layers in the film 210 construction, or may be incorporated elsewhere in the construction. Additional retarders that are selectively heat-treatable as discussed herein, or that are not heat-treatable, may also be added to the embodiment of FIG. 2, to achieve additional desired effects.

The disclosed optical films, and/or constituent films or layers thereof, can be heat-set or otherwise post-treated after film manufacture to improve dimensional stability. To improve dimensional stability, the film may be laminated to a glass plate or similar substrate. The plate may be part of a display, e.g. a Liquid Crystal Display (LCD) or an OLED display, or another suitable device. The film may be adhered or otherwise attached to another component layer of the display, or may be used as a substrate for deposition of various display components. In some cases, the film may be laminated or otherwise adhered to the glass or display before radiant energy treatment, and furthermore, treated with radiant energy after lamination. The film can be heat treated again to stabilize the adherence to the glass and final dimensions, e.g. the film can be deliberately shrunk, or creep processes can be activated to ensure dimensional stability under conditions needed for further processing of the overall display system. In this manner, registration can be achieved on the local and global scale, e.g. with display pixels in a display device. In some cases, the display components may be insensitive to the radiant energy, and the optical film may be pattern-wise heat treated after attachment to the display without additional considerations.

Figure 2A:
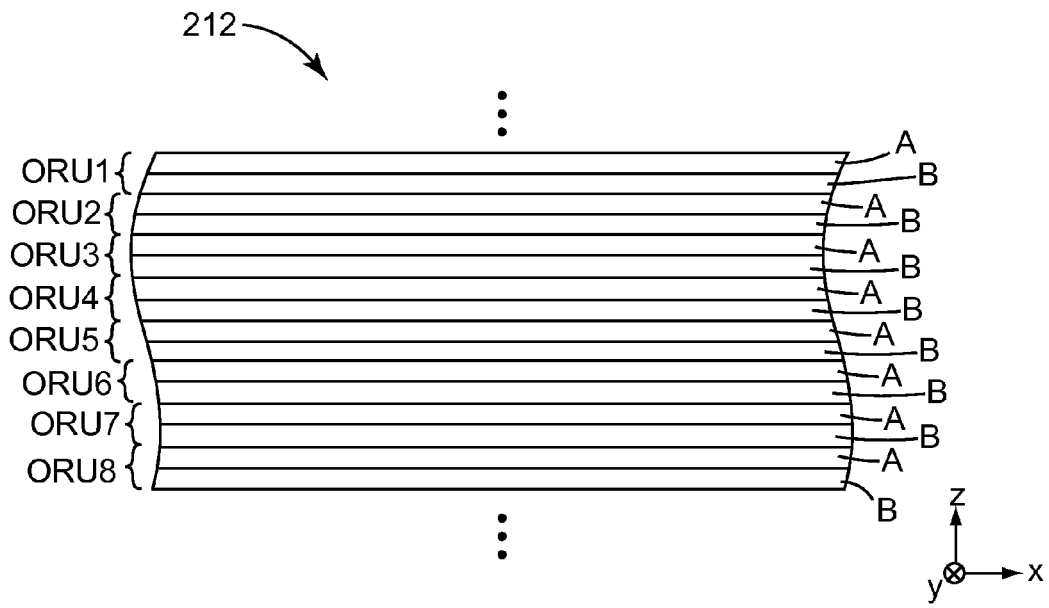
FIG. 2a is a schematic side view of an interior portion of the retarder film of FIG. 2, in particular, an effective medium stack of contiguous ultrathin layers configured to provide an effective optical medium for visible light.

Turning now to FIG. 2a, we see there a magnified schematic view of an interior portion of the retarder layer 212 of FIG. 2, in particular, an effective medium stack of contiguous ultrathin layers configured to provide an effective optical medium for visible light. The layer 212 is again shown in relation to the local x-y-z Cartesian coordinate system. Neither the layer 212 nor the optical film 210 of which it is a part need be entirely flat. They may be curved or otherwise shaped to deviate from a plane, and even in those cases arbitrarily small portions or regions of the film can be associated with a local Cartesian coordinate system as shown. The layer 212 may be considered to represent an effective medium stack disposed within the optical film 110 of FIG. 1 in any of its zones 112, 114, 116, since the individual layers of the patterned optical film 110 preferably extend continuously from each such zone to the next.

The individual ultrathin layers of the stack or layer 212 have, in at least some zones or areas of a patterned film, different intrinsic refractive indices. These ultrathin layers are sufficiently thin so that visible light propagates through the stack as if it were a non-layered medium or "effective medium". As discussed elsewhere herein, an optical repeat unit of the stack may have an optical thickness less than 190 nm, and/or the optical thickness of each ultrathin layer may be less than 95 nm, or less than 100, or 70, or 50, or 25 nm. For reference purposes, a wavelength λ of visible light is included in the figure to indicate such limitations on the thickness of the ultrathin layers is satisfied. To the extent the optical film may include significantly thicker layers such as optically thick PBLs 214, 216 (see FIG. 2), such layers are considered to lie outside of the effective medium stack. In FIG. 2a, the ultrathin layers of the effective medium stack are labeled "A" and "B", the "A" layers being composed of one material and the "B" layers being composed of a different material, these layers being stacked in an alternating arrangement to form optical repeat units or unit cells ORU 1, ORU 2, ... ORU 8 as shown. All of the "A" and "B" ultrathin layers shown in FIG. 2a are interior layers of the optical film 210. Typically, an effective medium stack composed entirely of polymeric materials would include many more than 16 ultrathin layers and 8 optical repeat units. The effective medium stack may, for example, comprise at least 10, 25, 50, or 100 contiguous ultrathin layers.

As mentioned above, the thickness fractions, $f_1$ and $f_2$, of a layer stack refers to the ratio of the physical thickness (not optical thickness) of a constituent layer to the physical thickness (not optical thickness) of the complete optical repeat unit. The thickness fractions $f_1$ and $f_2$ can be contrasted with optical f-ratios that are used to characterize optical repeat units in multilayer stacks that exhibit interference reflection bands. In the embodiment of FIG. 2a, the "A" layers are depicted as being about the same thickness as the "B" layers. Thus, if we use the subscript "1" to refer to the "A" layers and "2" to refer to the "B" layers, $f_1 \approx f_2 \approx 0.5$. Other thickness fraction combinations may also be selected. With regard to the physical thicknesses of the optical repeat units within the stack, any design target may be used, e.g., they may all have the same optical thickness, or they may instead exhibit a distribution of different optical thicknesses, but in either case they preferably satisfy the condition that the optical thickness of substantially each optical repeat unit in the stack is less than 190 nm.

At least one of the ultrathin layer sets, e.g. the "A" layers and/or the "B" layers, possess intrinsic birefringence before the selective heat treatment, and preferably also after heat treatment in at least one zone of the finished film (e.g., zones 112, 114, 116 of FIG. 1). The intrinsic refractive indices of the ultrathin layers, and the design details of the effective medium stack (such as the thickness fractions $f_1$ and $f_2$), determine what the effective refractive index of the stack and retarder layer 212 is, and thus also the retardation of the retarder layer 212 and optical film 210. The heat processing of the film can relax the intrinsic birefringence of one or both constituent ultrathin layers, thus changing the effective refractive index of the retarder layer 212 and the retardation of the retarder film. By judicious selection of the materials and stretch conditions used to make the effective medium stack, and by judicious selection of the radiant beam processing conditions, a wide variety of different retardation combinations can be achieved in a given patterned retarder film. These combination are discussed further below.

Exemplary optical films and effective medium stacks thereof are composed of polymer materials and may be fabricated using a variety of flow processes, including coextrusion, film casting, and film stretching or drawing processes. Typically, birefringence is developed in at least some layers through one or more of these various flow processes. Reference is made to U.S. Pat. No. 5,882,774 (Jonza et al.) "Optical Film", U.S. Pat. No. 6,179,948 (Merrill et al.) "Optical Film and Process for Manufacture Thereof", and U.S. Pat. No. 6,783,349 (Neavin et al.) "Apparatus for Making Multilayer Optical Films". The optical film may be formed by coextrusion of the polymers as described generally in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range. Without wishing to be limited, materials that may be useful in fabricating multilayer optical films as well as retarder films and/or other components of the disclosed composite films may include polymers such as one or more of: polyesters such as polyethylene terephthalate (PET), polyethylene naphthalate (PEN), and copolymers thereof, particularly the so-called "coPENs"; polystyrenes; polyacrylates; and polycarbonates. Syndiotactic polystyrene and its co-polymers are particularly useful as negatively birefringent materials. Moreover, co-polymers are particularly useful as the lower melting point material in a retarder film comprising two birefringent materials. Co-polymers of syndiotactic polystyrene that may be candidate materials for use in the disclosed effective medium stacks are disclosed in Guo et al., "Scandium-Catalyzed Cyclocopolymerization of 1,5-Hexadiene with ...", Macromolecules 2011, vol. 44, pp. 6335-6344. In general, most or all of these exemplary materials are materials that, after film orientation, contain substantially no unreacted reactive groups, both in untreated areas of the film (i.e., before radiant beam treatment) and in treated areas of the film (i.e., after radiant beam treatment), and such materials can be used in all the various STOF optical retarder film embodiments disclosed herein including e.g. those discussed in connection with FIGS. 5 and 6a through 6o.

In brief summary, the fabrication method of an optical film and an effective medium stack thereof may comprise: (a) providing at least a first and a second stream of resin corresponding to the first and second ultrathin polymer layers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film and at least quenching the film below the glass transition temperature of the constituent material of highest glass transition temperature. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

The multilayer web can be drawn or stretched to produce the near-finished optical retarder film. The drawing or stretching accomplishes two goals: it thins the layers to their desired final thicknesses, and it orients the layers such that at least some of the layers become birefringent. In some cases, orientation by stretching can be accomplished in the act of casting. More typically, orientation by stretching is accomplished following casting. Orientation via stretching to create the birefringent material layers is typically accomplished between the glass transition temperature and melting points of the constituent polymers. In particular, the orientation is accomplished by stretching from between about 10° C. below the glass transition temperature of the constituent polymer of highest glass transition temperature and the highest point of the melting point range for the birefringent constituent polymer of highest melting point. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be unconstrained or constrained, as discussed above. If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film. The birefringence of the constituent polymers may be fixed by the crystallization during stretching and post-stretching annealing or heat setting (wherein some dimensional relaxation may be allowed, e.g. such as a toe-in in a tenter). Alternatively, the birefringence may be fixed by quenching the stretched film below the glass transition temperature of the birefringent constituent material of lowest glass-transition temperature. The oriented, birefringent film may be wound into a roll.

Figure 3:
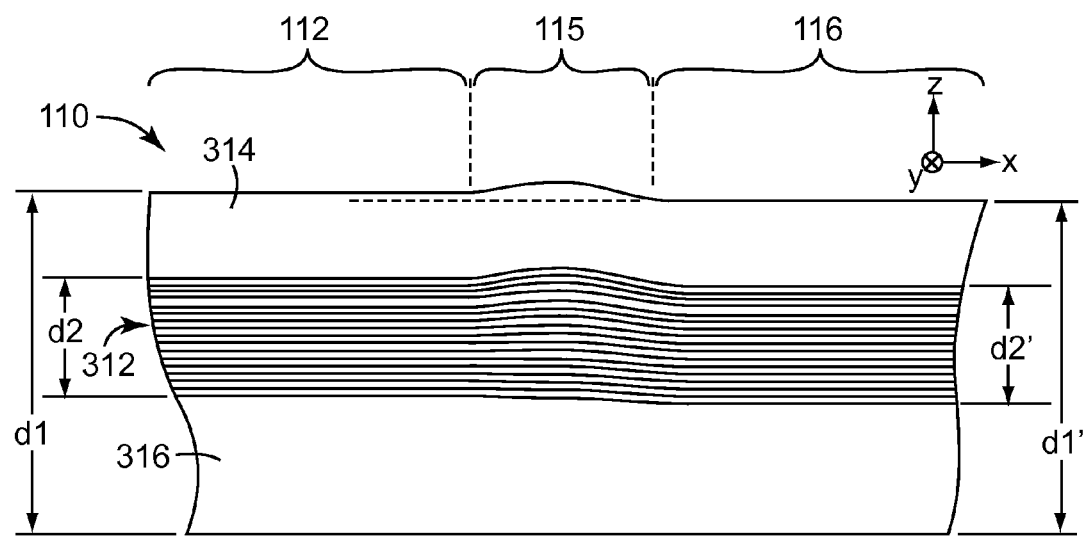
FIG. 3 is a schematic sectional view of a portion of the optical film of FIG. 1 at a boundary of a patterned or treated area.

We now turn to FIG. 3, which shows a portion of the optical film 110 of FIG. 1 in the vicinity of area 118 at a boundary of zone 112 and zone 116. In this expanded view of the film 110, a narrow transition zone 115 can be seen separating the zone 112 from the neighboring zone 116. Such a transition zone may or may not be present depending on processing details, and if it is not present then zone 116 may be immediately adjacent to zone 112 with no significant intervening features. Construction details of film 110 can also be seen: the film includes a retarder layer 312, which may also be referred to herein as retarder stack, disposed between protective boundary layers (PBL) 314, 316. In construction and design, the retarder layer 312 may be the same as or similar to retarder layer 212 discussed above, and the PBLs 314, 316 may be the same as or similar to the PBLs 214, 216 of FIG. 2. Although no skin layers are shown in FIG. 3, such layers may also be included (see FIG. 2), as well as other layers or substrates as discussed elsewhere herein.

The retarder layer 312 preferably comprises ultrathin alternating polymer materials arranged into optical repeat units, the ultrathin layers and optical repeat units extending continuously in a lateral or transverse fashion from the zone 112 to the neighboring zone 116 as shown. The retarder layer 312 provides a first optical retardation in the zone 112, and at least some of its constituent ultrathin layers are birefringent in this zone. In zones 115, 116, the constituent elements of film 110 may have previously had the same respective optical characteristics as they do in zone 112, but the retarder layer 312 has been processed by the selective application of heat thereto in an amount sufficient to reduce or eliminate the intrinsic birefringence of some of its constituent ultrathin layers in the zone 116, while maintaining the structural integrity of those layers in the treated zone 116 and also maintaining the birefringence of those ultrathin layers in zone 112, so that the patterned film 110 has a second optical retardation in zone 116 different from the first optical retardation. The reduced birefringence of ultrathin layers within the retarder layer 312 may be primarily responsible for the difference between the first and second optical retardations.

The film 110 has characteristic thicknesses d1, d2 in zone 112, and characteristic thicknesses d1', d2' in zone 116, as shown in the figure. The thicknesses d1, d1' are physical thicknesses measured from a front outer surface of the film to a rear outer surface of the film in the respective zones. The thicknesses d2, d2' are physical thicknesses measured from a front surface of the retarder layer 312 that is disposed nearest the front surface of the film 110 to a rear surface of the retarder layer 312 that is disposed nearest the rear surface of the film 110. Thus, if one wishes to compare the thickness of the film 110 in zone 112 with the thickness of the film in zone 116, one may choose to compare d1 to d1', or d2 to d2', depending on which measurement is more convenient. In most cases the comparison between d1 and d1' may well yield substantially the same result (proportionally) as the comparison between d2 and d2'. However, where a significant discrepancy exists, such as where a PBL layer experiences a significant thickness change from one place to another but no corresponding thickness change exists in the underlying microlayers, or vice versa, then it may be desirable to use the d2 and d2' parameters as being more representative of the overall film thickness in the different zones, in cases where the PBL layers have a minor effect on the optical retardation of the film compared to the effect of the retarder layer 312.

As mentioned, the zone 116 has been treated with the selective application of heat to cause at least some of the ultrathin layers of the retarder layer 312 to lose some or all of their birefringence relative to their birefringence in neighboring zone 112, such that zone 116 exhibits an optical characteristic, i.e., an optical retardation, that differs from an optical characteristic (optical retardation) of zone 112. The selective heating process may involve no selective application of pressure to zone 116, and it may result in substantially no thickness change (whether using the parameters d1/d1' or the parameters d2/d2') to the film. For example, the film 110 may exhibit an average thickness in zone 116 that deviates from an average thickness in zone 112 by no more than the normal variability in thickness that one observes in the zone 112, or in the untreated film. Thus, the film 110 may exhibit in zone 112, or over an area of the film encompassing a portion of zone 112 and zone 116 before the heat treatment of zone 116, a variability in thickness (whether d1 or d2) of $\Delta d$, and the zone 116 may have spatially averaged thicknesses d1', d2' which differ from spatially averaged thicknesses d1, d2 (respectively) in zone 112 by no more than $\Delta d$. The parameter $\Delta d$ may represent, for example, one, two, or three standard deviations in the spatial distribution of the thickness d1 or d2.

In some cases, the heat treatment of zone 116 may give rise to certain changes to the thickness of the film in zone 116. These thickness changes may result from, for example, local shrinkage and/or expansion of the different materials that constitute the optical film 110, or may result from some other thermally-induced phenomenon. However, such thickness changes, if they occur, play only a secondary role in their effect on the optical retardation of the film 110 in the treated zone 116 compared to the primary role played by the reduction or elimination of birefringence in the treated zone. Note also that in many cases it may be desirable to hold the film by its edges under tension during the selective heat treatment that accomplishes the internal patterning, in order to avoid wrinkling of the film, or for other reasons. The amount of tension applied and details of the heat treatment may also result in some amount of thickness change in the treated zones.

As we have discussed, in some cases the thickness of the film 110 in the treated zone 116, i.e., d1' or d2', may differ somewhat from the thickness of the film in the untreated zone 112, even if no selective pressure was in fact applied to the zone 116 during heat treatment. For this reason, FIG. 3 depicts d1' as being slightly different from d1, and d2' as being slightly different from d2. A transition zone 115 is also shown for generality, to show that a "bump" or other detectable artifact may exist on the outer surface of the film as a consequence of the selective heat treatment. In some cases, however, the treatment may result in no detectable artifact between the neighboring treated and untreated zones. For example, in some cases an observer who slides his or her finger across the boundary between the zones may detect no bump, ridge, or other physical artifact between the zones.

Under some circumstances it is possible for thickness differences between treated and untreated zones to be non-proportional through the thickness of the film. For example, in some cases it is possible for an outer skin layer to have a relatively small thickness difference, expressed as a percentage change, between the treated and untreated zones, while one or more internal layers or packets may have a larger thickness difference, also expressed as a percentage change, between the same zones.

Figure 4:
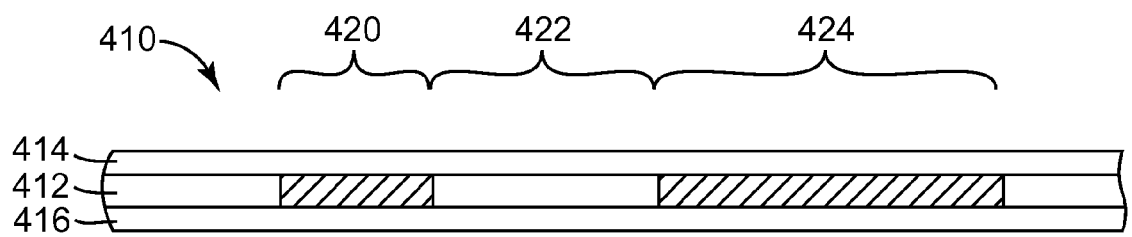
FIG. 4 is a schematic sectional view of a portion of another optical retarder film that incorporates internal patterning.

FIG. 4 is a schematic sectional view of a portion of another optical retarder film that incorporates internal patterning. Film 410 comprises outer optically thick skin and/or PBL layers 414, 416, and a packet of ultrathin layers forming an effective medium and functioning as a retarder layer 412 disposed between the skin layers. The retarder layer 412 may be the same as or similar to retarder layers 212 and 312 discussed above. All of the ultrathin layers of the retarder layer 412 are internal to the film 410. The ultrathin layers include at least some layers that are birefringent in at least some zones or areas of the film and that extend in a lateral or transverse fashion at least between neighboring zones of the film. The ultrathin layers provide a first optical retardation at least in a first untreated zone 422 of the film. The film 410 has been selectively heated in the neighboring zones 420, 424, without applying any pressure selectively to these zones, so as to provide a second optical retardation that differs from the first reflective characteristic. (Note in this context that "first optical retardation" and "second optical retardation" may be interpreted as pertaining to only the retarder layer 412, or to the entire film 410.) These differences in optical retardation may be perceived by an observer with the aid of one or more polarizer films, as discussed elsewhere herein. The film 410 may have substantially the same film thickness in the zones 420, 422, 424, or the film thickness may vary somewhat between these zones, but any difference in film thickness between the zones is not primarily responsible for the differences between the first and second optical retardation. The zones 420, 422, 424 form a pattern that is internal or interior to the film, as indicated by the crosshatching in the layer 412. The crosshatching indicates that at least some of the ultrathin layers in the crosshatched region have a reduced birefringence (including zero birefringence) compared to their birefringence in the zone 422 or in other untreated zones.

As mentioned above, a wide variety of different retardation combinations can be achieved in a given patterned retarder, by a judicious selection of the materials and stretch conditions used to make the effective medium stack, and by judicious selection of the radiant beam processing conditions. In some cases, the processed and/or unprocessed effective medium stack may contain only one ultrathin layer set (e.g., material "1") that exhibits intrinsic birefringence. In some cases, the processed and/or unprocessed effective medium stack may contain two ultrathin layer sets (e.g., material "1" and material "2") that exhibit intrinsic birefringence. In this case, the intrinsic birefringence of the different materials may be the same, e.g., both positively birefringent, or both negatively birefringent, or both biaxially birefringent, or both uniaxially birefringent, or they may be different. Furthermore, in this case, the melt temperatures of the materials may be selected to be significantly different, such that a first radiant beam can treat a first area or zone of the film by reducing the intrinsic birefringence of only one of the materials, and a second radiant beam can treat a second area or zone of the film by reducing the intrinsic birefringence of both materials. In some cases, a processed effective medium stack may contain no ultrathin layer sets that exhibit intrinsic birefringence—i.e., both (or all) ultrathin layer sets within the stack are substantially isotropic.

Figure 5:
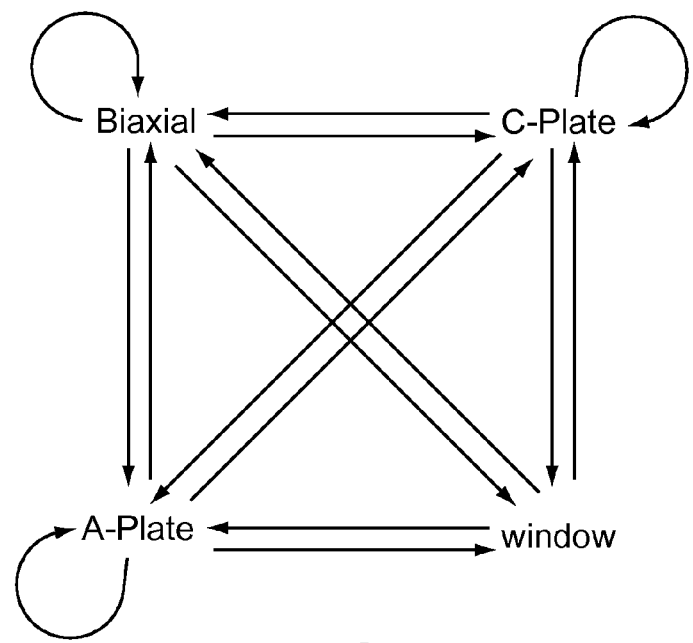
FIG. 5 is a schematic diagram that summarizes various transformations that can be achieved using the techniques discussed herein for optical retarding STOF films.

Moreover, combinations of these different material types can be used to provide various distinctly different combinations of retarder plate types in the processed and unprocessed zones. These retarder plate types are shown in FIG. 5, which summarizes various transformations that can be achieved using the disclosed techniques. In FIG. 5, for descriptive purposes, we identify separately "Biaxial" retarder plates, "A-Plate" retarder plates, "C-Plate" retarder plates, and "Window" retarder plates. Biaxial retarder plates, a-plates, and c-plates have been discussed above.

A "window" retarder plate is arguably a misnomer, but it is a useful term in the present discussion because it can be used to identify a portion of an optical film (e.g. in a treated or untreated zone thereof) that functions as a window film, wherein another portion of the same optical film (e.g. in an untreated or treated zone thereof) is not a window film but exhibits a significant optical retardation, e.g. as a biaxial retarder plate or a uniaxial retarder plate. "Window film", in this context, refers to a film that is substantially transparent, clear, and isotropic in refractive index (including effective refractive index). An isotropic film or layer provides no significant retardation for any propagation direction of light through the film or layer. Thus, an isotropic medium behaves as a clear window when viewed between polarizers. When both or all ultrathin layer types in an effective medium stack are individually isotropic in refractive index, the stack may or may not form an effective isotropic medium, unless the isotropic refractive indices of the materials are equal to each other. Rather, as a consequence of the different averaging schemes seen between the in-plane directions (see equations 1 and 2 above) and the thickness direction (see equation 3 above), the effective dielectric constants and effective refractive indices in these different directions may be substantially different, due to the effect of "form birefringence". Nevertheless, as discussed above, the form birefringence may in many cases be insignificant, thus providing a substantially isotropic or window film, unless for example the film is very thick, e.g., resulting in retardation due to form birefringence of more than 10 nm (or more than 20, 30, or 50 nm, or more depending on the application). When form birefringence is negligible, then equations (6) and (6a) may be used instead of equations (3) and (3a) for design purposes. We have found that isotropic films or window films may be provided by an effective medium stack by combining suitably different birefringent ultrathin material layers, e.g., positively birefringent material layers and negatively birefringent material layers. Stated differently, an effective isotropic medium, or window film, can be made using ultrathin layers that are individually birefringent, but whose birefringences can be can selected such that the effective dielectric constants of equations (1)-(3), and the effective refractive indices of equations (1a)-(3a), are substantially equal to each other, resulting in substantially equal effective refractive indices in all directions.

The arrows in FIG. 5 represent the transformations that can be achieved in a spatially tailorable optical retarder film as disclosed herein by the selective heat treatment of an effective medium stack in the optical film. Thus, with appropriate selection of constituent materials and processing conditions, the following transformations can be achieved:

- a biaxial retarder can be treated to become an a-plate retarder, and vice versa;
- a biaxial retarder can be treated to become a c-plate retarder, and vice versa;
- a biaxial retarder can be treated to become a window film, and vice versa;
- a biaxial retarder can be treated to become a biaxial retarder with different optical properties, e.g., having a greater or lesser optical retardation;
- an a-plate retarder can be treated to become a c-plate retarder, and vice versa;
- an a-plate retarder can be treated to become a window film, and vice versa;
- an a-plate retarder can be treated to become an a-plate retarder with different optical properties, e.g., having a greater or lesser optical retardation;
- a c-plate retarder can be treated to become a window film, and vice versa; and
- a c-plate retarder can be treated to become a c-plate retarder with different optical properties, e.g., having a greater or lesser optical retardation.

In general, a wide variety of uniaxial and biaxial spatially tailorable retarder films can be constructed when at least one anisotropic constituent material comprising one set of alternating ultrathin layers is used. A wider range of such retarder films can be constructed when at least two anisotropic constituent materials comprising two sets of alternating ultrathin layers are used. For example, a retarder film can be fabricated in which the overall effective refractive index in the z-direction, $n_z$, is intermediate between the in-plane values, $n_x$ and $n_y$. Moreover, it has been found that isotropic effective media comprising ultrathin layers can be constructed using layers of positively and negatively birefringent materials. When such films, comprising at least one effective medium stack of ultrathin layers, are selectively heated, e.g. by radiant energy (such as from a laser), such treated areas may be converted from one type of retarder to another. Such transformations are depicted in FIG. 5 and summarized above.

In particular, unusual effective refractive index transformations, with concomitant unusual optical retardation transformations, can be obtained by combining two different birefringent materials in the effective medium core. For example, combining a positively and negatively birefringent material can result in an out-of-plane effective refractive index ($n_z$) intermediate between the two in-plane effective refractive indices ($n_x$ and $n_y$), even though neither material by itself exhibits such behavior for the given draw conditions. In this manner, a wide variety of spatially patterned retarders can be made. The use of two different birefringent materials as the ultrathin layers in the effective medium also allow for a stepwise conversion of the retardation. Thus, by selecting two materials whose melting points are sufficiently different, and by delivering the radiant energy fast enough relative to the effects of thermal diffusion, then the retardation in the optical core can be step-wise reduced by delivering just enough energy to melt the lower melt point material without melting the higher melt point material. The resulting change in retardation is then the result of the loss or reduction of birefringence of only the lower melting point material. In these cases, it may be desirable for the skin layers and PBLs to comprise the higher melting point material, or another material such as an isotropic material.

When the effective medium retardation film includes only one birefringent material (e.g., ultrathin layers of material "1"), the second material is substantially isotropic and does not contribute to the retardation of the stack. The birefringent material may be situated not only in a core packet set of ultrathin layers, but also in the PBL layers and/or the skin layers, if present. In cases where the birefringent material resides solely in the core of the optical film, and not in any PBL layers or skin layers, the resulting range of possible retardation for the film then ranges from the original retardation to zero (isotropic). In cases where the birefringent material also resides in the skin layers and/or the PBLs, intermediate values of retardation may be more easily attained. For example, consider a spatially tailorable retarder film construction having a selectively absorbing core, and less absorbing or non-absorbing skin layers—e.g. where the absorbing agent is coextruded into the core layers but not the skin layers. If the PBLs are isotropic and relatively thick, e.g. at least 10% or even 25% or 50% of the core thickness, then it may be possible to more finely control the birefringent adjustments to specific intermediate values: unprocessed (untreated) areas of the film provide the full retardation, and intermediate processing provides only the residual retardation in the skin layers, since the skin layers would be converted from excessive heat delivered to them by thermal diffusion from the core. The PBLs may in part reduce the temperature wave successfully diffusing to the skin layers, e.g., below the threshold conversion level. This is one example of a spatially adjustable (patterned) retarder with a stepped intermediate condition. This is to be distinguished from a film construction in which the retardation can be made to vary smoothly or continuously as a function of processing conditions (such as laser power) between the endpoints of the retardation of the non-converted film portions and the retardation of the fully converted film portions.

Figure 6A:
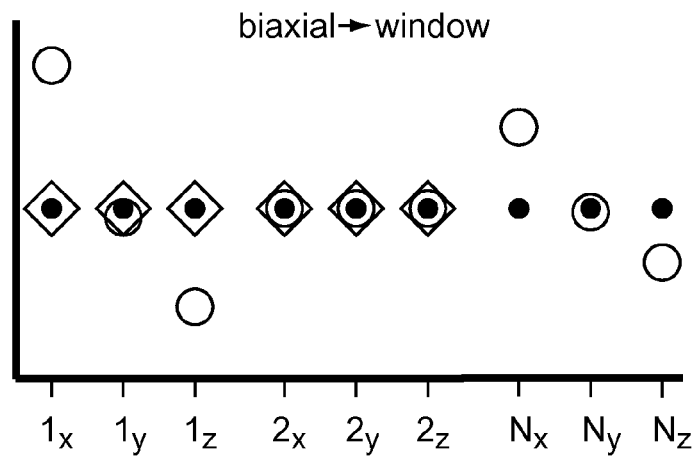
FIGS. 6a, 6b, 6c, ... 6m, 6n, 6o are idealized plots showing each intrinsic refractive index (nx, ny, nz) of two alternating ultrathin layers of an effective medium stack, for different stages of manufacture of various optical retarding STOF films, each figure also showing the resulting effective refractive index of the stack.
Figure 6B:
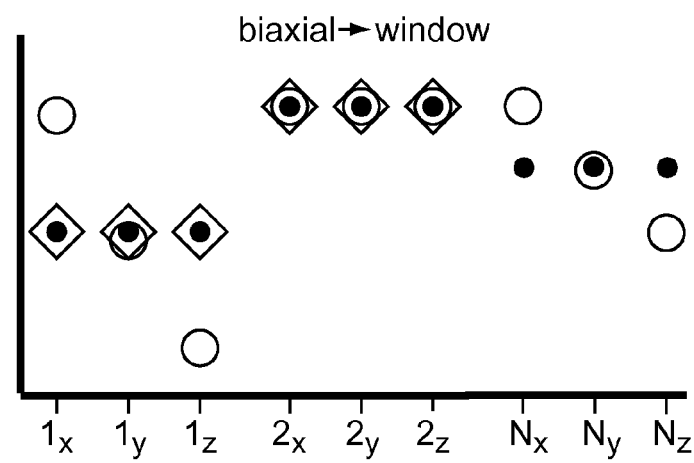
Figure 6C:
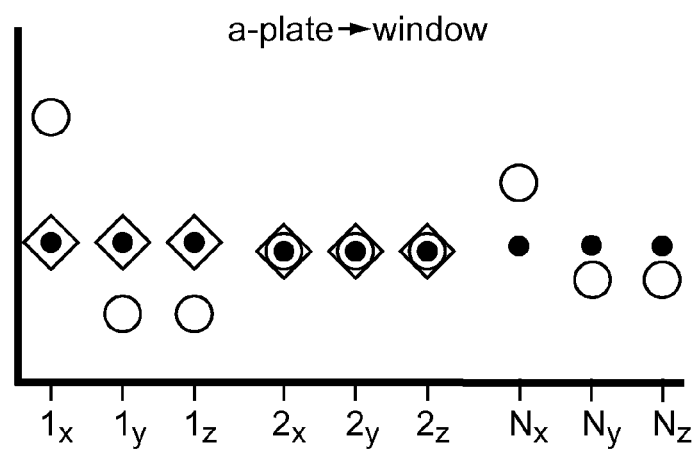
Figure 6D:
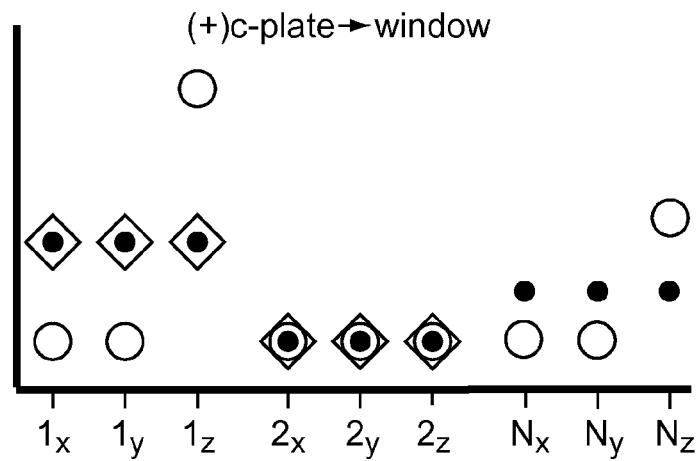
Figure 6E:
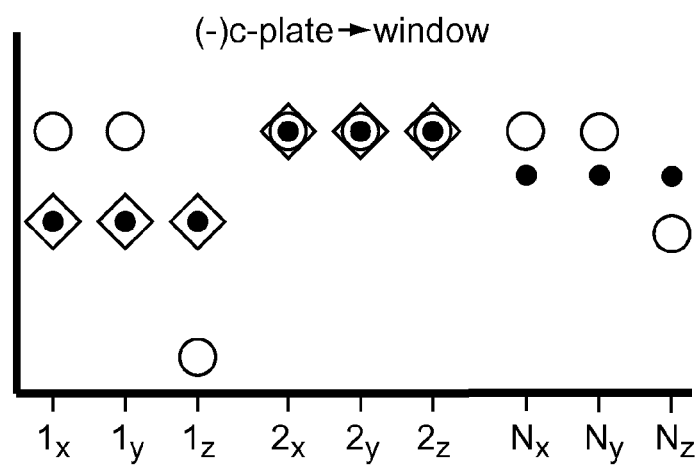
Figure 6F:
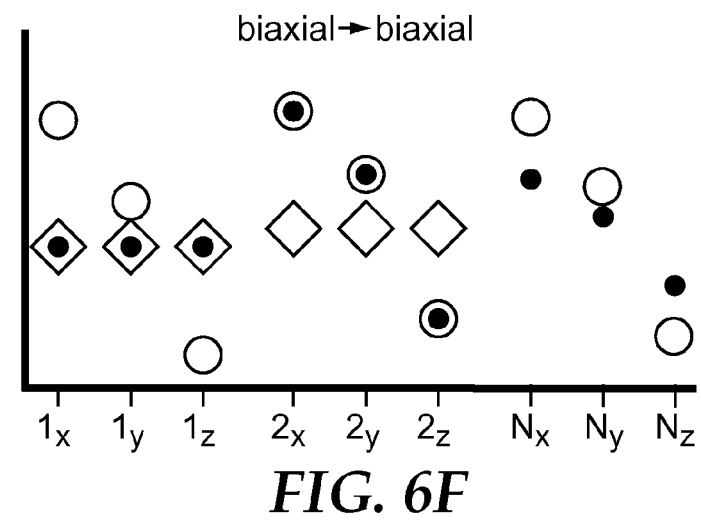
Figure 6G:
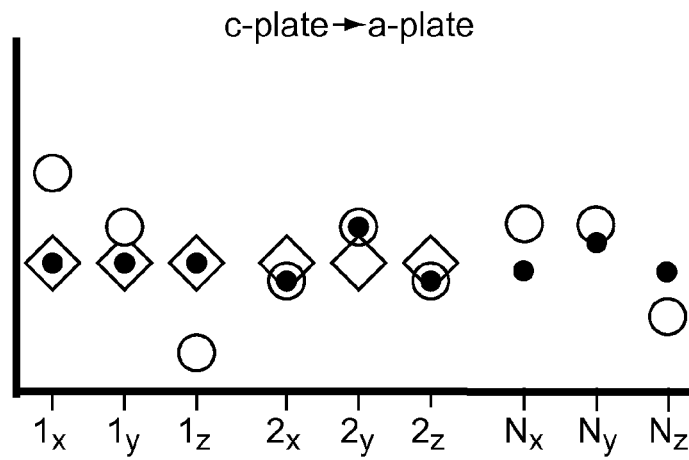
Figure 6H:
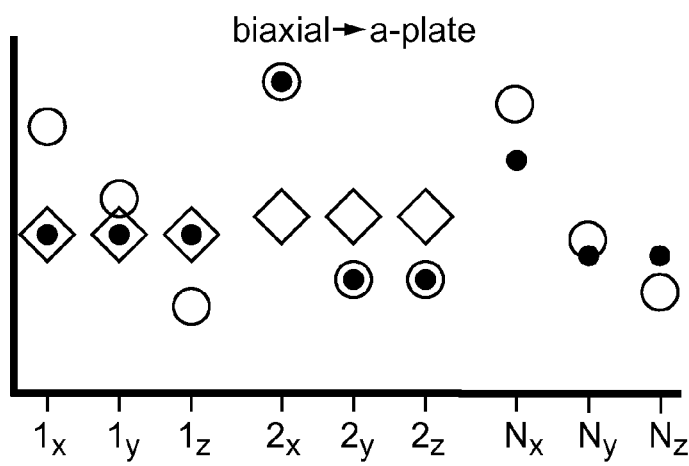
Figure 6I:
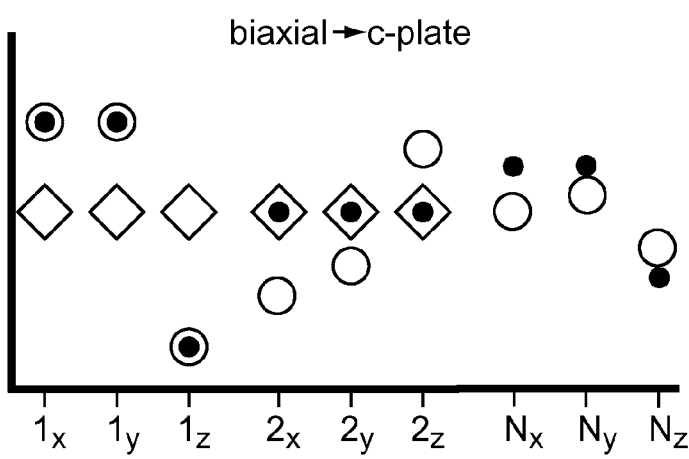
Figure 6J:
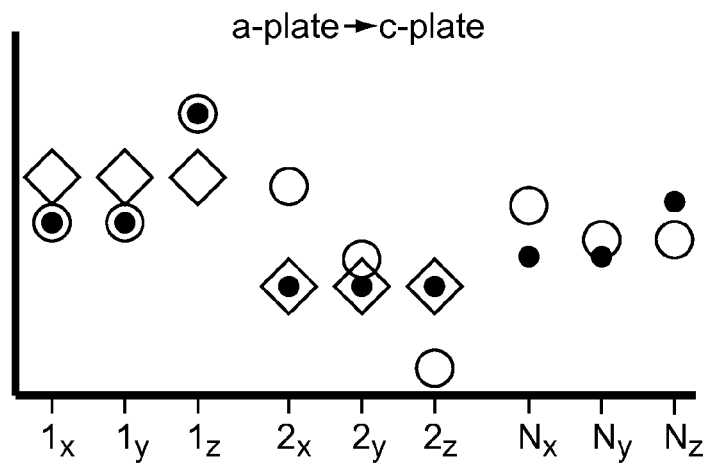
Figure 6K:
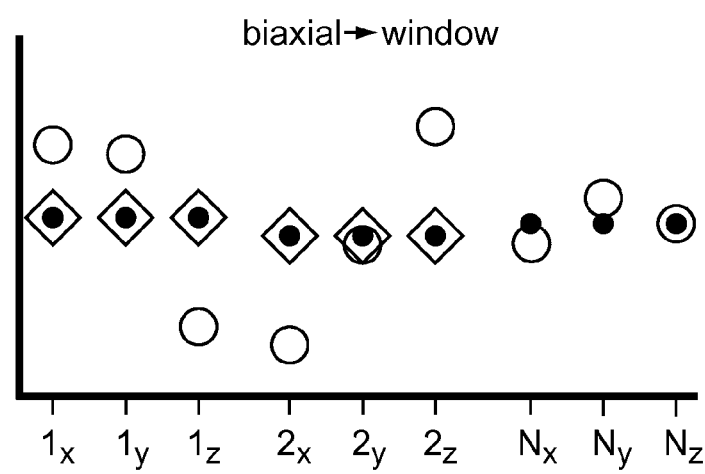
Figure 6L:
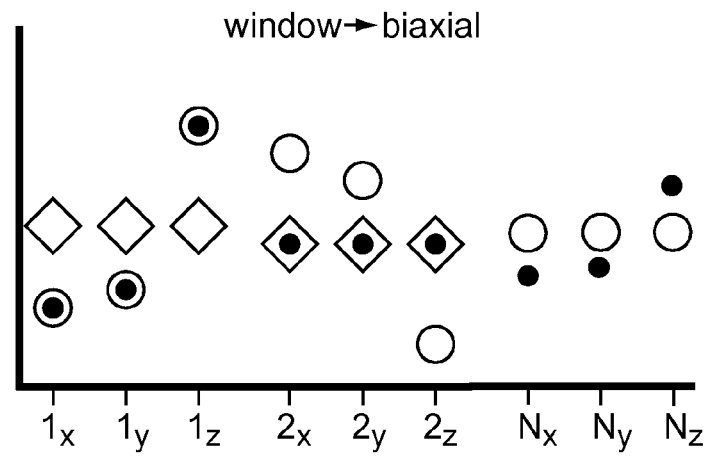
Figure 6M:
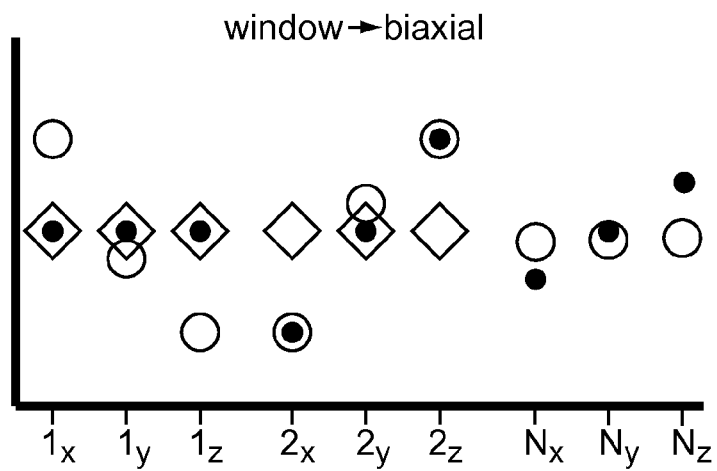
Figure 6N:
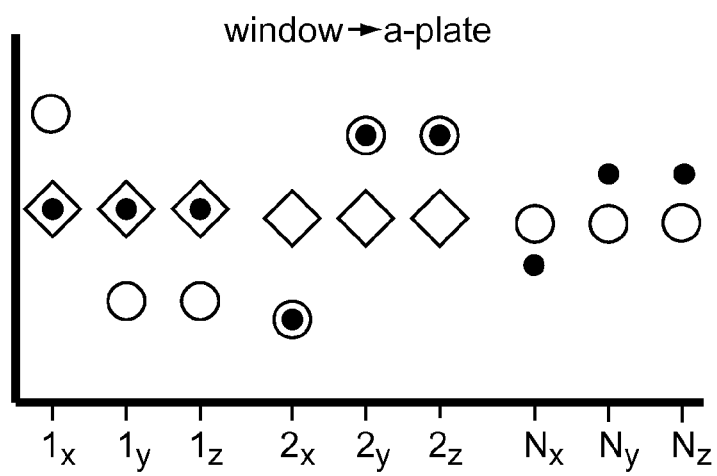
Figure 6O:
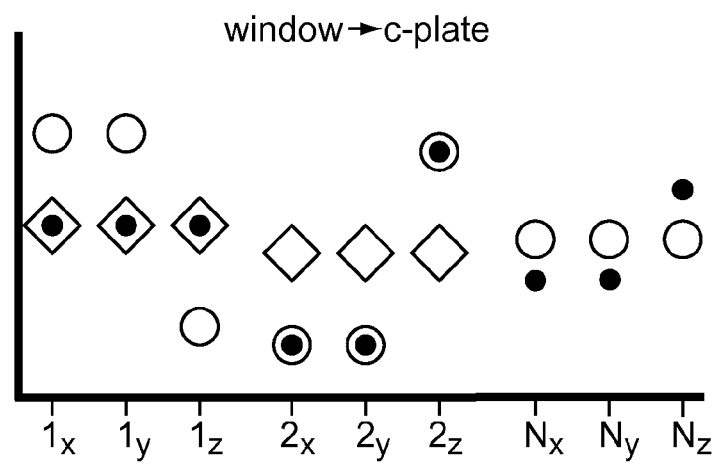

We thus turn our attention to the idealized graphs of FIGS. 6a through 6o (6a, 6b, 6c, . . . 6m, 6n, 6o). These are idealized plots showing each intrinsic refractive index (nx, ny, nz) of two alternating ultrathin layers of an effective medium stack, for different stages of manufacture of various optical retarding STOF films, each figure also showing the resulting effective refractive index of the stack.

These graphs help to explain the process of fabricating and patterning a spatially tailorable optical film. They also help explain some of the different possible combinations of first and second optical retardations in the untreated and treated zones, respectively, for any given writeable effective medium stack of ultrathin layers. For descriptive purposes, the optical retardation characteristic of the film, whether in a treated or untreated zone, may be categorized into one of following four types: a biaxial retardation, an a-plate retardation (which is a form of uniaxial retardation), a c-plate retardation (which is another form of uniaxial retardation), and window-like retardation (i.e., substantially no retardation).

In each of the graphs of FIGS. 6a through 6o, the vertical axis represents the relative refractive index "n", or, in the case of the constituent materials "1" and "2", the refractive index multiplied by the material's corresponding f-ratio as described above. On the horizontal axis, a position or mark is provided for each of the six refractive indices that characterize a two-layer optical repeat unit of a patternable effective medium stack: "1x", "1y", and "1z" represent the refractive indices (or refractive indices multiplied by the f-ratio $f_1$) of the first ultrathin layer along the x-, y-, and z-axes. Likewise, "2x", "2y", and "2z" represent the refractive indices (or refractive indices multiplied by the f-ratio $f_2$) of the second ultrathin layer along the x-, y-, and z-axes. The horizontal axis further include the labels "Nx", "Ny", and "Nz", which refer to the effective refractive index of the effective medium stack (formed from the first and second ultrathin layers) along the x-, y-, and z-axes. Diamond-shaped symbols (◊) in the figures represent refractive indices of the materials in a first processing stage. This first stage may correspond to polymer layers that have been extruded and quenched or cast onto a casting wheel, for example, but that have not yet been stretched or otherwise oriented. In this stage of processing, the layers that ultimately become the first and second ultrathin layers of the stack are typically too thick to form an effective medium for visible light, hence, no diamond-shaped symbols are provided for the labels Nx, Ny, Nz. Open (unfilled) circle-shaped symbols (○) in the figures represent refractive indices of materials in a second stage of processing, later than the first stage. The second stage may correspond to polymer layers that have been stretched or otherwise oriented into an optical film in which the first and second ultrathin layers form an effective medium stack. Small filled circle-shaped symbols or dots (•) in the figures represent refractive indices of the materials in a third stage of processing, later than the first and second stages. The third stage may correspond to polymer layers that, after being extruded and oriented, have been selectively heat treated, as discussed elsewhere herein. Such heat treatment is typically limited to one or more particular portions or zones of a film, referred to as treated zones.

By comparing the vertical coordinates of the various symbols in a given figure, the reader can readily ascertain a great deal of information about the optical retarder film, its method of manufacture, and the optical properties of its treated and untreated portions. For example, the reader can ascertain: if one or both material layers are or were birefringent before or after the selective heat treatment, and whether the birefringence is uniaxial or biaxial, and whether the birefringence is large or small. The reader can also ascertain from these figures the relative magnitudes of each of the refractive index differences $\Delta n_x$, $\Delta n_y$, $\Delta n_z$ between the two layers, as weighted by the thickness fractions $f_1$ and $f_2$, for each of the three processing stages (cast state, stretched state, and treated state). The reader can also ascertain from the figures whether the effective medium stack exhibits any birefringence in its effective refractive index, and if so, what type of birefringence is present, such as biaxial, uniaxial (a-plate), or uniaxial (c-plate).

As discussed above, a precursor article to the finished, internally patterned optical retarder film can be a cast web of polymer material. The cast web may have the same number of layers as the finished film, and the layers may be composed of the same polymer materials as those used in the finished film, but the cast web is thicker and its layers are usually all isotropic. In some cases, however, not depicted in the figures, the casting process may itself impart a level of orientation and birefringence in one or more of the materials. The diamond-shaped symbols in FIGS. 6a through 6o represent the refractive indices of the two material sets of polymer layers in the cast web that, after a subsequent stretching procedure, become the ultrathin layers in the effective optical medium of the optical film. After stretching, at least some of the layers become oriented and birefringent, and an oriented (but still unpatterned) multilayer optical film is formed. This is exemplified in FIGS. 6a through 6o by open circles that may be vertically displaced from their respective original values represented by the diamond-shaped symbols. For example, in FIG. 6c, the stretching procedure raises the refractive index of the first layers along the x-axis, but lowers their refractive index along the y- and z-axis. Such a refractive index shift may be obtained by suitably uniaxially stretching a positively birefringent polymer layer along the x-axis while allowing the film to dimensionally relax along the y- and z-axes. In FIG. 6e, the stretching procedure raises the refractive index of the first layers along the x- and y-axes, but lowers their refractive index along the z-axis. Such a refractive index shift may be obtained by suitably biaxially stretching a positively birefringent polymer layer along the x- and y-axes. In FIG. 6f, the stretching procedure raises the refractive index of both the first and second layers along the x-axis, produces a smaller refractive index increase for both layers along the y-axis, and lowers their respective refractive index along the z-axis. In some cases, this refractive index shift may be obtained by biaxially stretching a positively birefringent polymer layer asymmetrically along the x- and y-axes, using a higher degree of stretch along the x-axis compared to the y-axis. In other cases, this may be approximately obtained by uniaxially stretching along an x-axis while constraining the film in the y-axis (constrained uniaxial stretching). In FIG. 6m, a uniaxial stretching procedure raises the refractive index along the x-axis, produces a small refractive index decrease along the y-axis, and lowers the refractive index along the z-axis for the positively birefringent first ultrathin layers. Likewise in FIG. 6m, this same uniaxial stretching procedure lowers the refractive index along the x-axis, produces a small refractive index increase along the y-axis, and raises the refractive index along the z-axis for the negatively birefringent second ultrathin layers. Note that in FIGS. 6a through 6e, one of the layers in the oriented but untreated state (open circles) is birefringent because at least two of the open circles (1x, 1y, and 1z) have different values of refractive index n. In these depicted embodiments, the other polymer layer remains isotropic after stretching as indicated by the same refractive index values (2x=2y=2z) for the cast state and for the oriented but untreated state.

After formation of the at least partially birefringent optical film having the ultrathin layers arranged into optical repeat units to provide the effective medium stack having the first optical retardation (which can be ascertained based on the differences, if any, between the x, y, and z components of the effective refractive index), the film is ready for the selective heating discussed above. The heating is carried out selectively in a second zone which neighbors a first zone of the optical film, and is tailored to selectively melt and disorient in part or in whole at least one birefringent material in the effective medium stack in order to reduce or eliminate the birefringence in at least some of the ultrathin layers while leaving their birefringence unchanged in the first (untreated) zone. The selective heating is also carried out to maintain the structural integrity of the ultrathin layers in the second zone. If the birefringent material in the treated second zone is disoriented in whole, i.e., completely, then the birefringent layers return to the isotropic state (e.g. of the cast web), while remaining ultrathin. This can be seen in FIGS. 6a and 6b, where heat treatment causes the refractive indices of the first layers (see the small dark dots) to revert to their values in the cast web state (see the diamond-shaped symbols). Recall that the diamond-shaped symbols represent the refractive indices of layers in the isotropic state (e.g., the cast web), the small dark dots represent the refractive indices of the layers in the treated or selectively heated zones in the finished, internally patterned film, and the open circles represent the refractive indices of the layers in untreated zones of the finished, internally patterned film.

If the birefringent material in the treated second zone is disoriented only in part, i.e., incompletely, then the birefringent layers relax to a state of birefringence that is less than the birefringent state before heating but is not isotropic. In this case, the refractive indices of the birefringent material in the treated second zone acquire values somewhere between the diamond-shaped symbols and the open circles. Some examples of such incomplete birefringent relaxation are explained in more detail in commonly assigned PCT Publication WO 2010/075363 (Merrill et al.), "Internally Patterned Multilayer Optical Films With Multiple Birefringent Layers", incorporated herein by reference.

Some of the embodiments make use of a two-step drawing process that is described in U.S. Pat. No. 6,179,948 (Merrill et al.). In this process, the stretching or orientation of the cast film is carried out using a two-step drawing process that is carefully controlled so that one set of ultrathin layers (e.g., the first material layer of each optical repeat unit) substantially orients during both drawing steps, while the other set of ultrathin layers (e.g., the second material layer of each optical repeat unit) only substantially orients during one drawing step. The result is an effective medium stack having one set of material layers that are substantially biaxially oriented after drawing, and having another set of material layers that are substantially uniaxially oriented after drawing. The differentiation is accomplished by leveraging the different viscoelastic and crystallization characteristics of the two materials by using one or more suitably different process conditions such as temperature, strain rate, and strain extent for the two process drawing steps. Thus, for example, a first drawing step may substantially orient the first material along a first direction while at most only slightly orienting the second material along this direction. After the first drawing step, one or more process conditions are suitably changed such that in a second drawing step, both the first and the second materials are substantially oriented along a second direction. Through this method, the first ultrathin material layers can assume an essentially biaxially-oriented character (for example, the refractive indices may satisfy the relationship $n1x \neq n1y \neq n1z$, sometimes referred to as a uniaxially birefringent material), while the second ultrathin material layers in the very same effective medium stack can assume an essentially uniaxially-oriented character (for example, the refractive indices may satisfy the relationship $n2x \neq n2y \neq n2z \neq n2x$, sometimes referred to as a biaxially birefringent material).

In brief summary, FIGS. 6a through 6e represent examples in which only one of the two ultrathin materials develops an intrinsic birefringence after film orientation. FIGS. 6f, 6g, and 6h represent examples in which both of the two ultrathin materials develop an intrinsic birefringence after film orientation, and where the polarity or sign of these intrinsic birefringences is the same (e.g., + + or – –). FIGS. 6i through 6o represent examples in which both of the two ultrathin materials develop an intrinsic birefringence after film orientation, but where the polarity or sign of these intrinsic birefringences is opposite (e.g., + – or – +).

In FIG. 6a, first and second polymer materials are selected that have about the same refractive index, and the first polymer material has a positive stress-optic coefficient. The materials are coextruded in an alternating layer arrangement with a suitable number of layers to form a multilayer cast web, having refractive indices shown by the diamond-shaped symbols. The cast web is then uniaxially stretched along the x-axis (while dimensionally constraining the web along the orthogonal in-plane direction, i.e., the y-axis) under suitable conditions to induce birefringence in the first polymer material while the second polymer material remains isotropic. The stretching process increases the refractive index value 1x and decreases the refractive index value 1z. This set of refractive indices, when implemented in an effective medium stack with an adequate number of ultrathin layers, can provide the effective medium stack with an effective refractive index set that is biaxially birefringent, such that the stack functions as a biaxially birefringent retarder layer.

This optical retarder film can then be internally patterned in a second zone as described above, while leaving the optical retardation film intact in a first zone. Selective heating by selective delivery of radiant energy to the second zone causes the birefringent ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a biaxially birefringent retarder in one zone and a window layer in a neighboring zone, with ultrathin layers that extend continuously from one zone to the next. For FIG. 6a, the selective heat treatment process is able to change a biaxially birefringent retarder layer to a window layer, i.e.: biaxial→window.

In FIG. 6b, a first polymer material is selected that has a relatively low refractive index compared to that of the second polymer material, and the first polymer material has a positive stress-optic coefficient. The materials are coextruded in an alternating layer arrangement with a suitable number of layers to form a multilayer cast web, having refractive indices shown by the diamond-shaped symbols. The cast web is then uniaxially stretched along the x-axis (while dimensionally constraining the web along the orthogonal in-plane direction, i.e., the y-axis) under suitable conditions to induce birefringence in the first polymer material while the second polymer material remains isotropic. The stretching process increases the refractive index value 1x and decreases the refractive index value 1z. This set of refractive indices, when implemented in an effective medium stack with an adequate number of ultrathin layers, can provide the effective medium stack with an effective refractive index set that is biaxially birefringent, such that the stack functions as a biaxially birefringent retarder layer.

This optical retarder film can then be internally patterned in a second zone as described above, while leaving the optical retardation film intact in a first zone. Selective heating by selective delivery of radiant energy to the second zone causes the birefringent ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a biaxially birefringent retarder in one zone and a window layer in a neighboring zone, with ultrathin layers that extend continuously from one zone to the next. For FIG. 6b, the selective heat treatment process is able to change a biaxially birefringent retarder layer to a window layer, i.e.: biaxial→window.

In FIG. 6c, a first polymer material is selected that has a similar or slightly higher refractive index compared to that of the second polymer material, and the first polymer material has a positive stress-optic coefficient. The materials are coextruded in an alternating layer arrangement with a suitable number of layers to form a multilayer cast web, having refractive indices shown by the diamond-shaped symbols. The cast web is then uniaxially stretched along the x-axis (using truly uniaxial draw conditions, i.e., allowing full web relaxation along the orthogonal in-plane direction, i.e., the y-axis) under suitable conditions to induce birefringence in the first polymer material while the second polymer material remains isotropic. The stretching process increases the refractive index value 1x and decreases the refractive index values 1y and 1z. This set of refractive indices, when implemented in an effective medium stack with an adequate number of ultrathin layers, can provide the effective medium stack with an effective refractive index set that is uniaxially birefringent, such that the stack functions as an a-plate retarder layer.

This optical retarder film can then be internally patterned in a second zone as described above, while leaving the optical retardation film intact in a first zone. Selective heating by selective delivery of radiant energy to the second zone causes the birefringent ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a uniaxially birefringent a-plate retarder in one zone and a window layer in a neighboring zone, with ultrathin layers that extend continuously from one zone to the next. For FIG. 6c, the selective heat treatment process is able to change an a-plate retarder layer to a window layer, i.e.: a-plate→window.

In FIG. 6d, a first polymer material is selected that has a higher refractive index compared to that of the second polymer material, and the first polymer material has a negative stress-optic coefficient. The materials are coextruded in an alternating layer arrangement with a suitable number of layers to form a multilayer cast web, having refractive indices shown by the diamond-shaped symbols. The cast web is then biaxially stretched equally along the x- and y-axes under suitable conditions to induce birefringence in the first polymer material while the second polymer material remains isotropic. The stretching process decreases the refractive index values 1x and 1y, and increases the refractive index value 1z. This set of refractive indices, when implemented in an effective medium stack with an adequate number of ultrathin layers, can provide the effective medium stack with an effective refractive index set that is uniaxially birefringent, such that the stack functions as a c-plate retarder layer. The c-plate can be characterized as a positive c-plate, because nz is greater than nx and ny.

This optical retarder film can then be internally patterned in a second zone as described above, while leaving the optical retardation film intact in a first zone. Selective heating by selective delivery of radiant energy to the second zone causes the birefringent ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a uniaxially birefringent (positive) c-plate retarder in one zone and a window layer in a neighboring zone, with ultrathin layers that extend continuously from one zone to the next. For FIG. 6d, the selective heat treatment process is able to change a positive c-plate retarder layer to a window layer, i.e.: (+) c-plate→window.

In FIG. 6e, a first polymer material is selected that has a lower refractive index compared to that of the second polymer material, and the first polymer material has a positive stress-optic coefficient. The materials are coextruded in an alternating layer arrangement with a suitable number of layers to form a multilayer cast web, having refractive indices shown by the diamond-shaped symbols. The cast web is then biaxially stretched equally along the x- and y-axes under suitable conditions to induce birefringence in the first polymer material while the second polymer material remains isotropic. The stretching process increases the refractive index values 1x and 1y, and decreases the refractive index value 1z. This set of refractive indices, when implemented in an effective medium stack with an adequate number of ultrathin layers, can provide the effective medium stack with an effective refractive index set that is uniaxially birefringent, such that the stack functions as a c-plate retarder layer. The c-plate can be characterized as a negative c-plate, because nz is less than nx and ny.

This optical retarder film can then be internally patterned in a second zone as described above, while leaving the optical retardation film intact in a first zone. Selective heating by selective delivery of radiant energy to the second zone causes the birefringent ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a uniaxially birefringent (negative) c-plate retarder in one zone and a window layer in a neighboring zone, with ultrathin layers that extend continuously from one zone to the next. For FIG. 6e, the selective heat treatment process is able to change a negative c-plate retarder layer to a window layer, i.e.: (−) c-plate→window.

In FIG. 6f, first and second polymer materials are selected that have about the same refractive index, and both materials have a positive stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is then asymmetrically biaxially stretched, more along the x-axis than along the y-axis, under suitable conditions to induce birefringence in both the first and second polymer material. The stretching process increases the refractive index values 1x and 2x, increases the refractive index values 1y and 2y by a substantially smaller amount, and decreases the refractive index values 1z and 2z. This set of refractive indices, when implemented in an effective medium stack with an adequate number of ultrathin layers, can provide the effective medium stack with an effective refractive index set that is biaxially birefringent, such that the stack functions as a biaxial retarder layer. The effective refractive index Nz is seen to be less than Nx and Ny.

This optical retarder film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is again biaxially birefringent, but with a decreased birefringence, such that the stack functions in the second zone as a modified (reduced birefringence) biaxial retarder layer. The finished film thus combines in a unitary film a biaxially birefringent retarder in one zone and a modified biaxial retarder layer (with reduced optical retardation) in a neighboring zone, with ultrathin layers that extend continuously from one zone to the next. For FIG. 6*f*, the selective heat treatment process is able to change a biaxial retarder layer to another biaxial retarder layer, i.e.: biaxial→biaxial.

In FIG. 6*g*, first and second polymer materials are selected that have about the same refractive index, but the first material has a positive stress-optic coefficient, while the second material has a negative stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is (1) uniaxially stretched along the x-direction in a first step under conditions that induce birefringence in the first material but not the second material, and then (2) uniaxially stretched (using truly uniaxial draw conditions) along the y-direction, with a lower draw ratio than in step (1), under conditions that induce birefringence in both the first and second materials. The stretching process increases the refractive index value 1x, decreases the refractive index value 1z, and increases the refractive index values 1y and 2y, while decreasing the refractive index values 2x and 2z, by substantially smaller amounts. This set of refractive indices, when implemented in an effective medium stack with an adequate number of ultrathin layers, can provide the effective medium stack with an effective refractive index set that is uniaxially birefringent, such that the stack functions as a uniaxial c-plate retarder layer. The c-plate can be characterized as a negative c-plate, because nz is less than nx and ny.

This optical retarder film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is again biaxially birefringent, such that the stack functions in the second zone as a uniaxial a-plate retarder layer. The finished film thus combines in a unitary film a c-plate retarder in one zone and an a-plate retarder layer in a neighboring zone, with ultrathin layers that extend continuously from one zone to the next. For FIG. 6*g*, the selective heat treatment process is able to change a c-plate retarder layer to an a-plate retarder layer, i.e.: c-plate→a-plate.

In FIG. 6*h*, a first polymer material is selected that has a similar or slightly higher refractive index compared to that of the second polymer material, and both materials have a positive stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is (1) weakly uniaxially stretched along the y-direction in a first step under conditions that induce birefringence in the first material but not the second material, and then (2) strongly uniaxially stretched (using truly uniaxial draw conditions) along the x-direction under conditions that induce birefringence in both the first and second materials. The stretching process increases the refractive index value 1x and 2x, increases to a lesser extent the refractive index value 1y, and decreases the refractive index values 1z, 2y, and 2z. This set of refractive indices, when implemented in an effective medium stack with an adequate number of ultrathin layers, can provide the effective medium stack with an effective refractive index set that is biaxially birefringent, such that the stack functions as a biaxial retarder layer.

This optical retarder film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is uniaxially birefringent, such that the stack functions in the second zone as a uniaxial a-plate retarder layer. The finished film thus combines in a unitary film a biaxial retarder in one zone and an a-plate retarder layer in a neighboring zone, with ultrathin layers that extend continuously from one zone to the next. For FIG. 6*h*, the selective heat treatment process is able to change a biaxial retarder layer to an a-plate retarder layer, i.e.: biaxial→a-plate.

In FIG. 6*i*, first and second polymer materials are selected that have about the same refractive index, and the first material has a positive stress-optic coefficient, while the second material has a negative stress-optic coefficient. The second material has a substantially lower melting temperature than that of the first material. The materials are coextruded in an alternating layer arrangement with a suitable number of layers to form a multilayer cast web, having refractive indices shown by the diamond-shaped symbols. The cast web is (1) uniaxially stretched along the y-direction in a first step under conditions that induce birefringence more strongly in the first material than the second material, and then (2) uniaxially stretched along the x-direction (while dimensionally constraining the web along the orthogonal in-plane direction, i.e., the y-axis) under conditions that induce birefringence in both the first and second materials. The stretching process increases the refractive index values 1x and 1y, increases to a lesser extent the refractive index value 2z, decreases the refractive index value 1z, and decreases to lesser extents the refractive index values 2x and 2y. This set of refractive indices, when implemented in an effective medium stack with an adequate number of ultrathin layers, can provide the effective medium stack with an effective refractive index set that is biaxially birefringent, such that the stack functions as a biaxial retarder layer.

This optical retarder film can then be internally patterned in a second zone as described above, while leaving the optical retardation film intact in a first zone. Selective heating by selective delivery of radiant energy to the second zone is tailored to cause only the second ultrathin layers to relax to their original isotropic states, or to an intermediate birefringent state if the disorientation is incomplete, while allowing the first ultrathin layers to substantially maintain their birefringence. If relaxation of the second layers is complete, the effective medium stack acquires an effective refractive index set that is uniaxially birefringent, such that the stack functions in the second zone as a uniaxial c-plate retarder layer. The finished film thus combines in a unitary film a biaxial retarder in one zone and a c-plate retarder layer in a neighboring zone, with ultrathin layers that extend continuously from one zone to the next. For FIG. 6*i*, the selective heat treatment process is able to change a biaxial retarder layer to a c-plate retarder layer, i.e.: biaxial→c-plate.

In FIG. 6*j*, a first polymer material is selected that has a higher refractive index compared to that of the second polymer material, and the first material has a negative stress-optic coefficient, while the second material has a positive stress-optic coefficient. The second material has a substantially lower melting temperature than that of the first material. The materials are coextruded in an alternating layer arrangement with a suitable number of layers to form a multilayer cast web, having refractive indices shown by the diamond-shaped symbols. The cast web is (1) uniaxially stretched along the y-direction in a first step under conditions that induce birefringence more strongly in the first material than the second material, and then (2) uniaxially stretched along the x-direction (while dimensionally constraining the web along the orthogonal in-plane direction, i.e., the y-axis) under conditions that induce birefringence in both the first and second materials. The stretching process increases the refractive index values 1z and 2x, increases to a lesser extent the refractive index value 2y, decreases the refractive index value 2z, and decreases to a lesser extent the refractive index values 1x and 1y. This set of refractive indices, when implemented in an effective medium stack with an adequate number of ultrathin layers, can provide the effective medium stack with an effective refractive index set that is uniaxially birefringent, such that the stack functions as a uniaxial a-plate retarder layer.

This optical retarder film can then be internally patterned in a second zone as described above, while leaving the optical retardation film intact in a first zone. Selective heating by selective delivery of radiant energy to the second zone is tailored to cause only the second ultrathin layers to relax to their original isotropic states, or to an intermediate birefringent state if the disorientation is incomplete, while allowing the first ultrathin layers to substantially maintain their birefringence. If relaxation of the second layers is complete, the effective medium stack acquires an effective refractive index set that is uniaxially birefringent, such that the stack functions in the second zone as a uniaxial c-plate retarder layer. The finished film thus combines in a unitary film a uniaxial a-plate retarder in one zone and a uniaxial c-plate retarder layer in a neighboring zone, with ultrathin layers that extend continuously from one zone to the next. For FIG. 6j, the selective heat treatment process is able to change an a-plate retarder layer to a c-plate retarder layer, i.e.: a-plate→c-plate.

In FIG. 6k, a first polymer material is selected that has a similar or slightly higher refractive index compared to that of the second polymer material, and the first material has a positive stress-optic coefficient, while the second material has a negative stress-optic coefficient. The first and second materials may have the same or similar melting temperatures. The materials are coextruded in an alternating layer arrangement with a suitable number of layers to form a multilayer cast web, having refractive indices shown by the diamond-shaped symbols. The cast web is (1) uniaxially stretched along the y-direction in a first step under conditions that induce birefringence more strongly in the first material than the second material, and then (2) uniaxially stretched along the x-direction (while dimensionally constraining the web along the orthogonal in-plane direction, i.e., the y-axis) under conditions that induce birefringence in both the first and second materials. The stretching process increases the refractive index values 1x, 1y, and 2z, and decreases the refractive index values 1z and 2x. This set of refractive indices, when implemented in an effective medium stack with an adequate number of ultrathin layers, can provide the effective medium stack with an effective refractive index set that is biaxially birefringent, such that the stack functions as a biaxial retarder layer.

This optical retarder film can then be internally patterned in a second zone as described above, while leaving the optical retardation film intact in a first zone. Selective heating by selective delivery of radiant energy to the second zone is tailored to cause both the first and second ultrathin layers to relax to their original isotropic states, or to an intermediate birefringent state if the disorientation is incomplete. If relaxation is complete, the effective medium stack acquires an effective refractive index set that is isotropic, such that the stack functions in the second zone as a window layer. The finished film thus combines in a unitary film a biaxial retarder in one zone and a window layer in a neighboring zone, with ultrathin layers that extend continuously from one zone to the next. For FIG. 6k, the selective heat treatment process is able to change a biaxial retarder layer to a window layer, i.e.: biaxial→window.

In FIG. 6L, a first polymer material is selected that has a similar or slightly higher refractive index compared to that of the second polymer material, and the first material has a negative stress-optic coefficient, while the second material has a positive stress-optic coefficient. The second material has a substantially lower melting temperature than that of the first material. The materials are coextruded in an alternating layer arrangement with a suitable number of layers to form a multilayer cast web, having refractive indices shown by the diamond-shaped symbols. The cast web is asymmetrically biaxially stretched, more along the x-axis than along the y-axis, under suitable conditions to induce birefringence in both the first and second materials. The stretching process increases the refractive index values 1z, 2x, and 2y, and decreases the refractive index values 1x, 1y, and 2z. This set of refractive indices, when implemented in an effective medium stack with an adequate number of ultrathin layers, can provide the effective medium stack with an effective refractive index set that is isotropic, such that the stack functions as a window layer.

This optical retarder (window) film can then be internally patterned in a second zone as described above, while leaving the optical retardation film intact in a first zone. Selective heating by selective delivery of radiant energy to the second zone is tailored to cause only the second ultrathin layers to relax to their original isotropic states, or to an intermediate birefringent state if the disorientation is incomplete, while allowing the first ultrathin layers to substantially maintain their birefringence. If relaxation of the second layers is complete, the effective medium stack acquires an effective refractive index set that is biaxially birefringent, such that the stack functions in the second zone as a biaxial retarder. The finished film thus combines in a unitary film a window film in one zone and a biaxial retarder in a neighboring zone, with ultrathin layers that extend continuously from one zone to the next. For FIG. 6L, the selective heat treatment process is able to change a window layer to a biaxial layer, i.e.: window→biaxial.

In FIG. 6m, first and second polymer materials are selected that have about the same refractive index, and the first material has a positive stress-optic coefficient, while the second material has a negative stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is uniaxially stretched along the x-axis (while dimensionally constraining the web along the orthogonal in-plane direction, i.e., the y-axis), under suitable conditions to induce birefringence in both the first and second materials. The stretching process increases the refractive index values 1x and 2z, decreases the refractive index values 1z and 2x, and changes the refractive index values of 1y and 2y by lesser amounts. This set of refractive indices, when implemented in an effective medium stack with an adequate number of ultrathin layers, can provide the effective medium stack with an effective refractive index set that is isotropic, such that the stack functions as a window layer.

This optical retarder (window) film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is biaxially birefringent, such that the stack functions in the second zone as a biaxial retarder. The finished film thus combines in a unitary film a window film in one zone and a biaxial retarder in a neighboring zone, with ultrathin layers that extend continuously from one zone to the next. For FIG. 6m, the selective heat treatment process is able to change a window layer to a biaxial layer, i.e.: window→biaxial.

In FIG. 6n, a first polymer material is selected that has a similar or slightly higher refractive index compared to that of the second polymer material, and the first material has a positive stress-optic coefficient, while the second material has a negative stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is uniaxially stretched along the x-axis (using truly uniaxial draw conditions, i.e., allowing full web relaxation along the orthogonal in-plane direction, i.e., the y-axis), under suitable conditions to induce birefringence in both the first and second materials. The stretching process increases the refractive index values 1x, 2y, and 2z, and decreases the refractive index values 1y, 1z, and 2x. This set of refractive indices, when implemented in an effective medium stack with an adequate number of ultrathin layers, can provide the effective medium stack with an effective refractive index set that is isotropic, such that the stack functions as a window layer.

This optical retarder (window) film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is uniaxially birefringent, such that the stack functions in the second zone as an a-plate retarder. The finished film thus combines in a unitary film a window film in one zone and a uniaxial a-plate retarder in a neighboring zone, with ultrathin layers that extend continuously from one zone to the next. For FIG. 6n, the selective heat treatment process is able to change a window layer to an a-plate layer, i.e.: window→a-plate.

In FIG. 6o, a first polymer material is selected that has a slightly higher refractive index compared to that of the second polymer material, and the first material has a positive stress-optic coefficient, while the second material has a negative stress-optic coefficient. The first material has a substantially lower melting temperature than that of the second material. The materials are coextruded in an alternating layer arrangement with a suitable number of layers to form a multilayer cast web, having refractive indices shown by the diamond-shaped symbols. The cast web is biaxially stretched equally along the x- and y-axes under suitable conditions to induce birefringence in both the first and second materials. The stretching process increases the refractive index values 1x, 1y, and 2z, and decreases the refractive index values 1z, 2x, and 2y. This set of refractive indices, when implemented in an effective medium stack with an adequate number of ultrathin layers, can provide the effective medium stack with an effective refractive index set that is isotropic, such that the stack functions as a window layer.

This optical retarder (window) film can then be internally patterned in a second zone as described above, while leaving the optical retardation film intact in a first zone. Selective heating by selective delivery of radiant energy to the second zone is tailored to cause only the first ultrathin layers to relax to their original isotropic states, or to an intermediate birefringent state if the disorientation is incomplete, while allowing the second ultrathin layers to substantially maintain their birefringence. If relaxation of the first layers is complete, the effective medium stack acquires an effective refractive index set that is uniaxially birefringent, such that the stack functions in the second zone as a c-plate retarder. The finished film thus combines in a unitary film a window film in one zone and a uniaxial c-plate retarder in a neighboring zone, with ultrathin layers that extend continuously from one zone to the next. For FIG. 6o, the selective heat treatment process is able to change a window layer to a c-plate layer, i.e.: window→c-plate.

The scenarios discussed above involve only some of a multitude of possible combinations of retarder types for the first zone, retarder types for the second zone, material characteristics, and processing parameters that can be used to produce other internally patterned optical retarder films, and should not be considered to be limiting. Note that not just positively birefringent but also negatively birefringent materials, and combinations thereof, can be used. For example, additional scenarios can be readily obtained by reflecting the figures through the horizontal axis, e.g. compare FIGS. 6d and 6e. Note also that in cases where the combination of a birefringent and isotropic polymer is used, the birefringent polymer may have a pre-stretch isotropic index that is less than, greater than, or equal to the refractive index of the isotropic polymer. The relative magnitudes of the various initial and final state retardations can also be varied. For example, constraints on equations (1) through (3), within the available degrees of freedom, can be imposed to demand a relative amount of an initial principal retardation versus a final principal retardation; and, the results can be used to make appropriate material selections.

The fact that the change in the optical retardation characteristic of the STOF film is associated primarily with heat-induced relaxation in birefringence of a material or layer of the STOF film means that the selective treatment process used to pattern the STOF film may be primarily one-way or irreversible. For example, a given area or zone of the STOF film that has been processed (selectively heat treated by absorption of radiant energy) so that its initial first optical retardation has been changed to a second optical retardation may thereafter not be able to be processed with another radiant beam to re-acquire its original first optical retardation. In fact, if the initial heat treatment substantially eliminated birefringence in the zone, then further radiant treatment with the same or similar radiant beam may have little or no additional effect on the optical retardation of the zone. This one-way or irreversible aspect of STOF film patterning may be particularly advantageous e.g. in security applications where, for example, tamper-resistance is important, or in display or opto-electronic applications where for example stability to optical or electronic fields, used to switch other component elements, is desired. In other applications, this one-way or irreversible aspect of STOF film patterning in a continuous phase may be combined with switchable elements in another phase, e.g. in opto-electronic devices where for example a stable, patterned continuous phase with birefringence in a first zone and little or no birefringence in a second zone is desired.

Figure 7:
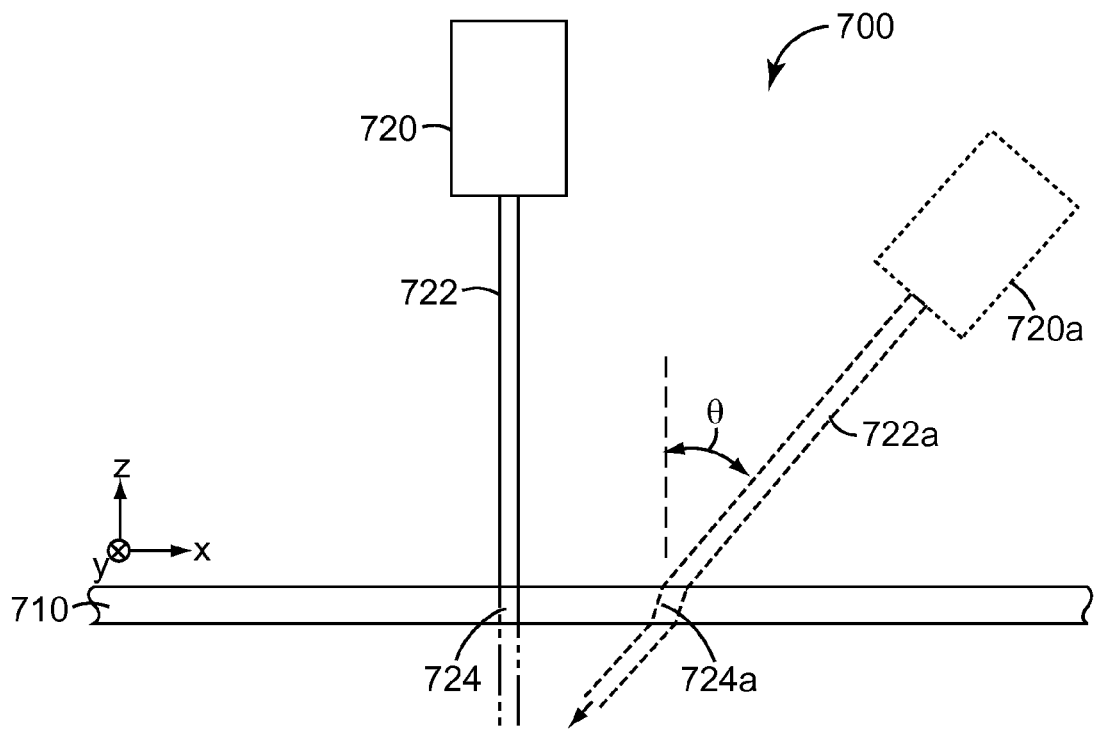
FIG. 7 is a schematic side view of an arrangement for selectively heating an optical retarding STOF film to accomplish internal patterning.

In FIG. 7, we show one arrangement 700 that can be used to selectively heat the second zone of the optical retarding STOF films to provide the disclosed patterned (e.g. internally patterned) films. Briefly, a STOF optical retarder film 710 is provided that comprises at least one effective medium stack of ultrathin layers that extends throughout the film, or at least from a first to a second zone thereof. The effective medium stack is internal to the optical film, and provides a uniform optical retardation over the useable area of the film. A high radiance light source 720 provides a directed beam 722 of suitable wavelength, intensity, and beam size to selectively heat an illuminated portion 724 of the film 710 by converting some of the incident light to heat by absorption. Preferably, the absorption of the film is great enough to provide sufficient heating with a reasonably-powered light source, but not so high that an excessive amount of light is absorbed at the initial surface of the film, which may cause surface damage. This is discussed further below. In some cases it may be desirable to orient the light source at an oblique angle θ, as shown by the obliquely positioned light source 720a, directed beam 722a, and illuminated portion 724a.

In some cases, the directed beam 722 or 722a may be shaped in such a way that the illuminated portion 724 or 724a has the desired shape of the finished second zone. In other cases, the directed beam may have a shape that is smaller in size than the desired second zone. In the latter situation, beam steering equipment can be used to scan the directed beam over the surface of the optical film so as to trace out the desired shape of the zone to be treated. Spatial and temporal modulation of the directed beam can also be utilized with devices such as beam splitters, lens arrays, pockels cells, acousto-optic modulators, and other techniques and devices known to those of ordinary skill in the art.

Figure 8A:
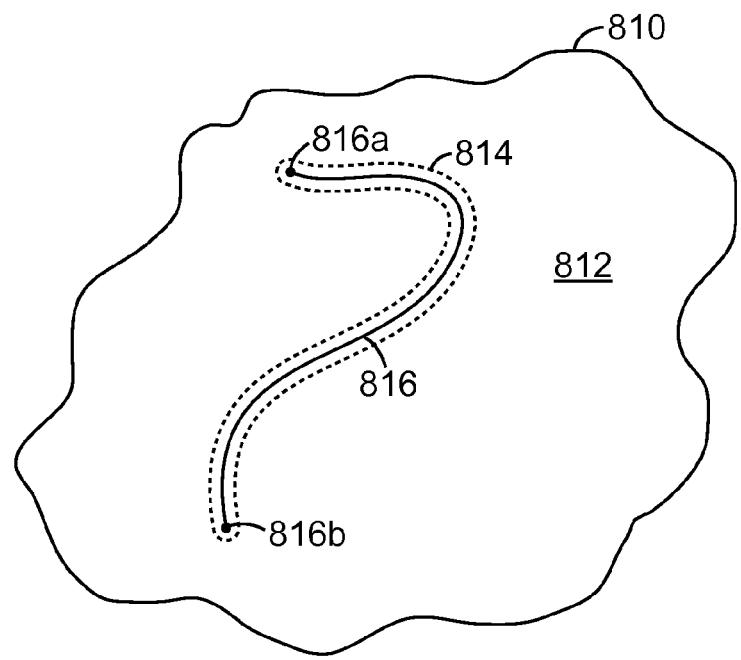
FIGS. 8A-C are schematic top views of different second zones of an internally patterned optical retarding film, and superimposed thereon possible paths of a light beam relative to the film capable of forming the depicted zones.
Figure 8B:
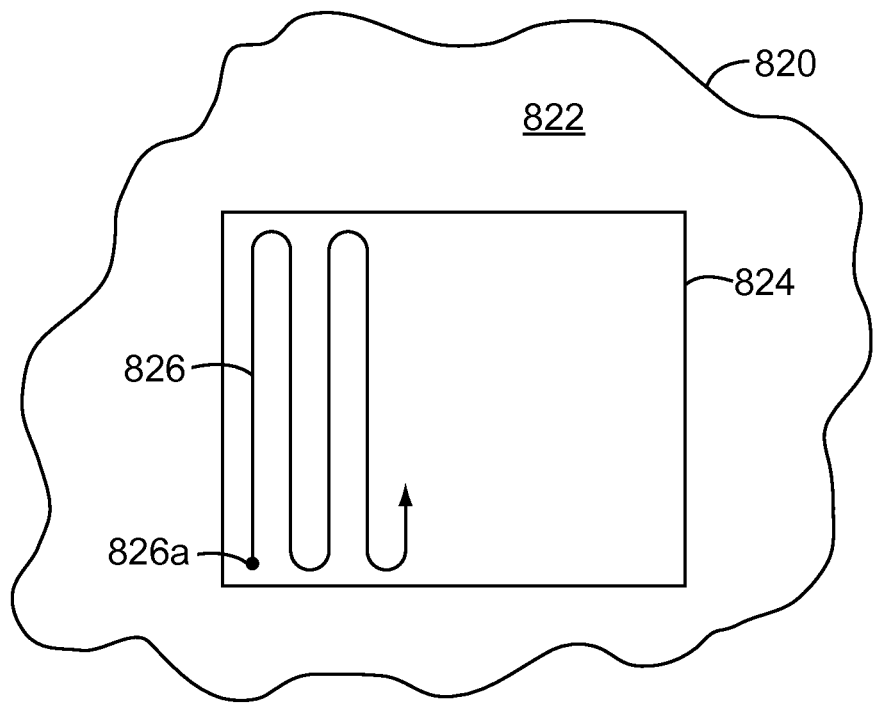
Figure 8C:
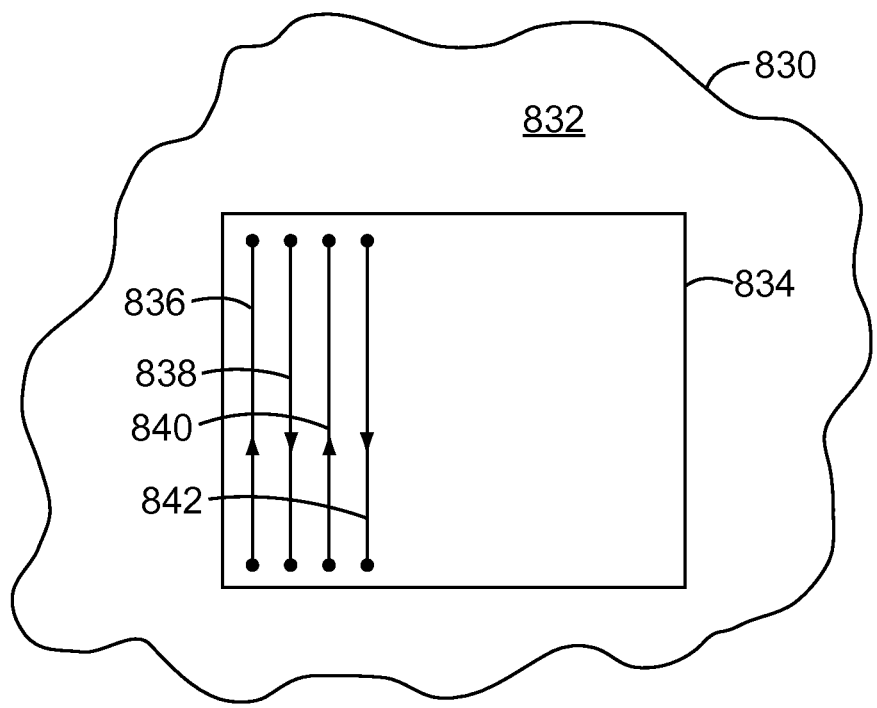

FIGS. 8A-C provide schematic top views of different second zones of an internally patterned optical retarding film, and superimposed thereon possible paths of a directed light beam relative to the film capable of forming the depicted zones. In FIG. 8A, a light beam is directed at a patternable retarder film 810 and scanned at a controlled speed from a starting point 816a to an ending point 816b along a path 816 to selectively heat the film in an arbitrarily-shaped zone 814 to distinguish its optical retardation from that of a first zone 812. FIGS. 8B and 8C are similar. In FIG. 8B, a light beam is directed at a patternable retarder film 820 and scanned at a controlled speed from a starting point 826a along a path 826 to selectively heat the film in a rectangular-shaped zone 824 to distinguish its optical retardation from that of a neighboring first zone 822. In FIG. 8C, a light beam is directed at a patternable retarder film 830 and scanned at controlled speeds along the discontinuous paths 836-842, and so on, to selectively heat the film in a rectangular-shaped zone 834 to distinguish its optical retardation from that of a neighboring first zone 832. In each of FIGS. 8A-C, the heating is sufficient to reduce or eliminate birefringence of at least some interior ultrathin layers or materials in the second zone while maintaining the birefringence of those layers or materials in the first zone, and is accomplished while maintaining the structural integrity of the ultrathin layers in the second zone and without any selective application of pressure to the second zone.

The directed light beam may also be modulated to create paths that are dashed, dotted, or otherwise broken or discontinuous. The modulation may be complete, wherein the light beam intensity changes from 100% or "full on" to 0% or "full off". Alternatively, the modulation may be partial. Further, the modulation may include abrupt (e.g. stepwise) changes in beam intensity, and/or it may include more gradual changes in beam intensity.

Figure 9A:
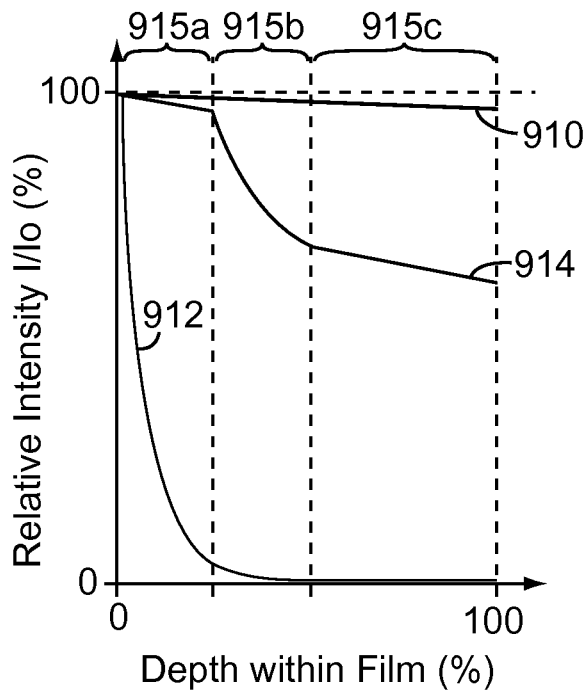
FIG. 9A is an idealized plot showing the relative intensity of a beam of light as a function of the depth as the light beam propagates into the film, with three curves provided for three different optical films.
Figure 9B:
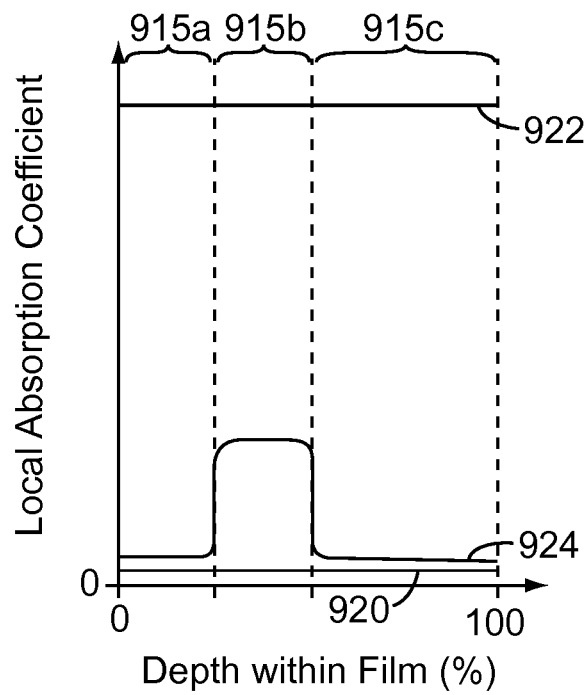
FIG. 9B is an idealized plot showing a local absorption coefficient as a function of the depth or axial position within the film, with three curves corresponding to the three curves of FIG. 9A.

FIGS. 9A and 9B address the topic of how the absorption of the patternable STOF film can or should be tailored to provide optimal localized heating. The graphs of FIGS. 9A and 9B are plotted on the same horizontal scale, which represents the depth or position of the radiant light beam as it propagates through the film. A depth of 0% corresponds to the front surface of the film, and a depth of 100% corresponds to the rear surface of the film. FIG. 9A plots along the vertical axis the relative intensity $I/I_0$ of the radiant beam. FIG. 9B plots the local absorption coefficient (at the selected wavelength or wavelength band of the radiant beam) at each depth within the film.

Three curves are plotted in each figure, for three patternable optical film embodiments. In a first embodiment, the film has a substantially uniform and low absorption throughout its thickness at the wavelength of the directed light beam. This embodiment is plotted as curve 910 in FIG. 9A and curve 920 in FIG. 9B. In a second embodiment, the film has a substantially uniform and high absorption throughout its thickness. This embodiment is plotted as curve 912 in FIG. 9A and curve 922 in FIG. 9B. In a third embodiment, the film has a relatively low absorption throughout regions 915a and 915c of its thickness, but has a higher, intermediate absorption in region 915b of its thickness.

The first embodiment has an absorption coefficient that is too low for many situations. Although the directed light beam is absorbed uniformly as a function of depth as indicated by the constant slope of the curve 910, which may be desirable in some cases, very little of the light is actually absorbed as shown by the high value of the curve 910 at a depth of 100%, meaning that a high percentage of the directed light beam is wasted. Nevertheless, in some cases this first embodiment may still be quite useful in the treatment of some films. The second embodiment has an absorption coefficient that is too high for many situations. Although substantially all of the directed light beam is absorbed, and none is wasted, the high absorption causes an excessive amount of light to be absorbed at the front surface of the film, which may cause surface damage to the film. If the absorption is too high, an adequate amount of heat cannot be delivered to interior layers or materials of interest without damaging layers at or near the front surface of the film. The third embodiment utilizes a non-uniform absorption profile that may be achieved, for example, by incorporating an absorbing agent into selected interior layers of the film. The level of absorptivity (controlled by the local absorption coefficient) is desirably set to an intermediate level so that an adequate portion of the directed light beam is absorbed in the tailored absorbing region 915b of the film, but the absorptivity is not so high that an excessive amount of heat is delivered to the incident end of the region 915b relative to the opposite end. In many instances, the absorptivity in absorbing region 915b is still reasonably weak, e.g. the relative intensity profile 914 over that region may appear more as a straight line with merely a steeper slope than the other regions, e.g. 915a and 915c. The adequacy of the absorption may be determined by balancing that absorptivity against the power and duration of the incoming directed light beam to achieve the desired effect.

In an elementary example of the third embodiment, the patternable film may have a construction of two thick skin or PBL layers with one or more effective medium packet or stack of ultrathin layers therebetween (separated by protective boundary layers if two or more such packets are included), and the film may be composed of only two polymer materials A and B. An absorbing agent is incorporated into polymer material A to increase its absorptivity to a moderate level but no absorbing agent is incorporated into polymer B. Both materials A and B are provided in alternating ultrathin layers of the effective medium stack(s), but the skin layers and the protective boundary layers, if present, are composed only of polymer B. Such a construction will have a low absorptivity at the outer surfaces, i.e. the skin layers, of the film, due to the use of the weakly absorbing material B, and will also have a low absorptivity at the optically thick PBLs if they are present. The construction will have a higher absorptivity in the effective medium stack(s) due to the use of the more strongly absorbing material A in alternating ultrathin layers (along with alternating ultrathin layers of the more weakly absorbing material B). Such an arrangement can be used to preferentially deliver heat to interior layers of the film, e.g. to one or more interior effective medium stack(s), rather than to outer surface layers. Note that with an appropriately designed feedblock the optical retarder film can comprise three or more different types of polymer materials (A, B, C, . . . ), and an absorptive agent may be incorporated into one, some, or all of the materials, or to only selected layers that are composed of any of these materials, in order to provide a wide variety of different absorption profiles so as to deliver heat to selected interior layers, packets, or regions of the film. In other cases, it may be useful to include an absorbing agent in the PBL(s) or even in the skin layer, if present. In either case, the loading or concentration may be same or different, either higher or lower, than in the ultrathin layers.

Potential applications of the disclosed STOF retarder films include graphical displays and optical devices. See, e.g., B. M. I. van der Zande et. al, *SID Symposium Digest of Technical Papers*, (2003), pp. 194-197. Patterned retarders have been used to improve brightness and contrast in reflective and transflective displays, viewing angles in transmissive displays, and to form 3D graphical displays. See, e.g.: S. J. Roosendaal et al., *SID Symposium Digest of Technical Papers*, (2003), pp 78-81; Karman, et al., Proc. Eurodisplay, (2002) p. 515; C. H. Tsai et al. *Proc. of SPIE*, Vol. 3957 (2000) p. 142; UK Patent GB 2,420,188 (Fukaishi et al.); U.S. Patent Application Publication US 2006/0082702 (Jacobs et al.); PCT publication WO 2004/004362 (Jacobs et al.); PCT publication WO 2004/003630 (Jacobs et al.); and U.S. Pat. No. 7,116,387 (Tsai et al.). In particular, retardation can be controlled to multiple levels on a pixel-by-pixel basis e.g. for color compensation and viewing angle. Multi-level retarders, i.e., retarder films that have distinct and well-defined high, low, and at least one intermediate value of retardation, and/or optical films that utilize both a patternable retarder film and a patternable STOF reflector, can be used in these applications.

The disclosed STOF retarder films may be used in a wide variety of displays and other extended area optoelectronic devices, such as backlights, signs, luminaires, channel letters, light guiding or light piping systems, and the like. Such devices may emit polarized or unpolarized light. Such devices may emit white light, i.e., light perceived by an ordinary observer as nominally white, or light of a particular color other than white. Such devices may comprise arrays of liquid crystals, organic light emitting devices (OLEDs), and/or light emitting diodes (LEDs), for example. Such devices may be or comprise a 3-dimensional display, e.g., a stereoscopic display. Such devices may be or comprise transmissive displays, reflective displays, and/or transflective displays. Such devices may include edge-lit displays and/or direct-lit displays.

In addition to display applications, the disclosed STOF retarder films may also be useful in security applications. In this regard, the disclosed films may be used in a variety of security documents including identification cards, driver's licenses, passports, access control passes, financial transaction cards (credit, debit, pre-pay, or other), brand protection or identification labels, and the like as discussed further below. The film may be laminated or otherwise adhered as interior or exterior layers to other layers or portions of the security document. When the film is included as a patch, it may cover only a portion of the major surface of the card, page, or label. In some cases, it may be possible to use the film as the base substrate or the only element of the security document. The film may be included as one of many features in the security document such as holograms, printed images (intaglio, offset, barcode, etc.), retroreflective features, UV or IR activated images and the like. In some instances, the disclosed films may be layered in combination with these other security features. The film may be used to provide a personalizable feature to the security document, for example, a signature, an image, an individual coded number, etc. The personalizable feature may be in reference to the individual document holder or a specific product entity, such as in the case of a manufacturer tag, a lot verification tag, a tamper-proof coding, or the like. The personalizable feature can be made with a variety of scanning patterns including lines and dot patterns. Patterns can be the same or different among writable layers, depending on the film construction.

When the film is used alone or embedded within a clear laminate (e.g. formed from clear plastic such as polycarbonate, polyvinyl chloride, or polyester), the patterns or indicia can be viewed by placing the film construction between two polarizers. The construction can be viewed in both a crossed polarizer and a parallel polarizer configuration, with the polarizer axes oriented intermediate between the fast and slow axes of the effective medium stack. When the effective medium stack operates as a half-wave plate, complementary colors will be viewed in the crossed and parallel polarizer configurations.

Figure 10:
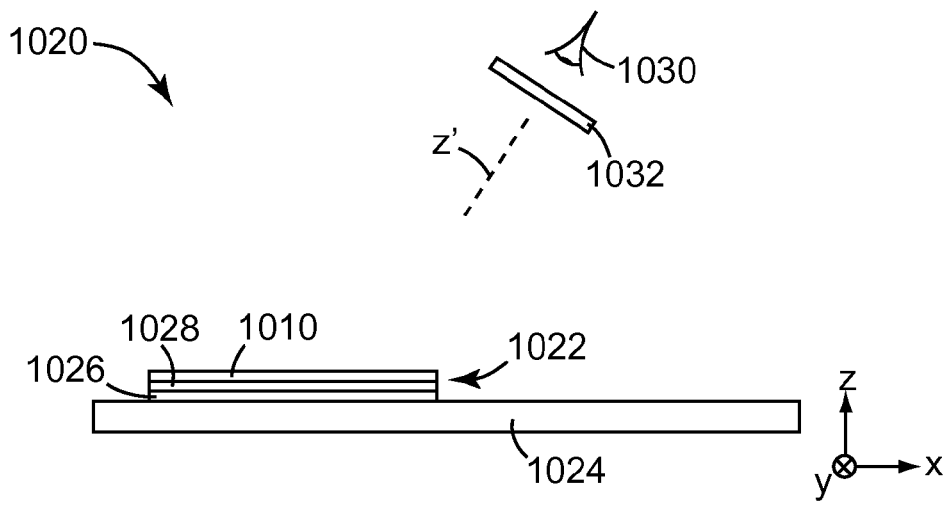
FIG. 10 is a schematic side or sectional view of a laminate article applied to a security document for anti-counterfeiting purposes, the laminate article including a patterned retarder film as disclosed herein.

One security application is depicted schematically in FIG. 10. There, a system 1020 includes a laminate article 1022 applied to a security document 1024 for anti-counterfeiting or other fraud-prevention purposes. The laminate article 1022 may include at least a reflective layer 1026, an optional polarizer 1028, and a STOF optical retarder film 1010. The reflective layer 1026 may be specularly reflective or diffusely reflective, and, in a simple embodiment, may be or comprise a piece of white or colored paper, a piece of filled plastic (e.g. polycarbonate, polyvinyl chloride, polyester, etc.), or other suitable material having a similar diffuse white or colored appearance. The layer 1026 may include conventional indicia e.g. as made using conventional printing techniques. The polarizer 1028 may be or comprise any suitable polarizer, whether absorptive or reflective. The STOF optical retarder film 1010 may be any of the optical films or constructions disclosed herein. Preferably, the film 1010 has been processed or treated to impart an indicia or pattern made up of at least first and second areas having different optical retardances. The retarder film 1010 may preferably be oriented (with respect to rotations about the z-axis) relative to the polarizer 1028 such that a fast axis of at least one area or zone of the retarder film is obliquely disposed, e.g. at an angle of about 45 degrees, relative to the pass axis or the block axis of the polarizer 1028. The reflective layer 1026, the polarizer 1028, and the STOF film 1010 may be laminated together in any suitable fashion, e.g., using one or more optically clear or otherwise light transmissive adhesive layer.

The laminate article 1022 may be incorporated into, attached to, or otherwise used in connection with the security document 1024. The security document 1024 may be or comprise a document or other article that a user wishes to preserve or protect from fraud, e.g., from counterfeiting, alteration, diversion, duplication, simulation, and/or substitution. (In this regard, a counterfeit may refer to a reproduction of a document, article, or security feature that is intended to deceive the close scrutiny of a qualified examiner; an alternation may refer to the modification of a document or article with the intent that it will pass as genuine with minimum risk of detection in circumstances of ordinary use; diversion may refer to the distribution or sale of legitimate products through unauthorized dealers; duplication may refer to the reproduction of a document or part thereof by means of a photoreproductive device; simulation may refer to the imitation of a document or article, including similar security features, in a form that is intended to pass as genuine in circumstances of ordinary use; and substitution may refer to the act of putting or using one document or item in place of another, wherein the substituted document or item is often of lesser quality or value.) For example, the security document may be or comprise at least one of an ID document, a passport, a vehicle license plate, a product package, an identification badge, a license, a card (including e.g. an identification card, or a credit, debit, pre-pay, or other financial transaction card), a pass, a label, a certificate, a bond, a title document, a negotiable instrument, and currency. The term "identification document" ("ID document") is broadly defined and is intended to include, but not be limited to, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards.

The disclosed STOF retarder films may provide covert security features to the security construction. For example, a writable retarder film may provide a covert feature viewable with a polarizing analyzer, e.g. a feature that becomes apparent or disappears depending on the polarization state of the analyzer. Thus, for example, an observer or detector 1030 may be unable to perceive the indicia embedded within the patterned STOF retarder film 1010, without the aid of a polarizing analyzer 1032. Rotating the analyzer 1032 about its thickness axis z' allows the observer 1030 to readily recognize the optical retardation pattern of the retarder film 1010.

With regard to the aforementioned constructions, a wide variety of color effects can be made by considering the initially oriented and finally treated states of the retardation. For example, when the initial retardation is a half-wave plate for a portion of the visible spectrum, an initial color can be viewed at normal incidence between crossed polarizers and a complementary color at normal incidence between parallel polarizers. Depending on the characteristics of the out-of-plane retardation, these colors may shift with off-normal viewing. Reducing the amount of retardation in the final treated state results in a modified color in the patterned region when viewed between crossed polarizers, and the complementary color of this modified color between parallel polarizers, both viewed on the background color fields of the untreated state. When the initial retardation results in an isotropic window, then the untreated background will be uncolored. Thus a colored pattern can be formed on a clear background. Likewise, when the final retardation is an isotropic window, then that portion of the pattern is clear. Thus a pattern or indicia comprising a clear foreground on a colored background, or vice versa, can be formed. Using an intermediate level of processing can introduce additional colors into foreground and/or background regions of the pattern.

In some cases of the aforementioned constructions, the color patterns revealed between polarizers can be digitally scanned and read by a machine. In such cases, the color patterns in the cross and parallel states can be used to cross-check the scan data and improve the accuracy or verify the authenticity of the scan. The scanning can be made in a transmissive or reflective mode, depending on the nature of the security article. If the security article comprises a polarizer, e.g. the laminate article 1022 of FIG. 10, then only one analyzing polarizer may be needed in the scan. The angle and height from the security article of the analyzing polarizer may be adjusted to improve contrast in reflection mode between the two polarizer configurations. The angle and/or height may be optimized manually or automatically.

EXAMPLES

Example 1

Two STOF optical films were fabricated. The first such film, referred to here as "Film 1", was made in accordance with the general description and examples provided in WO 2010/075357 (Merrill et al.), "Internally Patterned Multilayer Optical Films Using Spatially Selective Birefringence Reduction". This Film 1 included a multilayer optical film that substantially reflected blue light. A second STOF optical film, referred to here as "Film 2", was then made. The Film 2 utilized an effective medium stack of ultrathin layers, and functioned as a half-wave plate for red light.

Film 1 comprised alternating layers of PET and an acrylic copolymer. The PET, Eastapak™ PET 7352 available from Eastman Chemical Company, Kingsport, Tenn., was used for the high index optical layers. The acrylic copolymer, under the trade designation Altuglas™ 510 available from Altuglas International, Philadelphia, Pa., was used for the low index optical layers. Film 1 was formed by co-extruding the PET, also comprising approximately 0.14 wt % Amaplast™ IR-1050 infra-red absorbing dye, available from ColorChem, GA, with the acrylic copolymer into approximately 150 alternating material layers in a multilayer feedblock. The outer layers of the coextruded films were protective boundary layers (PBLs) comprising the PET. This approximately 150 layer coextruded material was further coextruded with a final coextruded pair of skin layers, also comprising the PET but without the absorbing dye. The weight ratios of the feedstreams for the PET in the skin layers, the PET in the optical packet, and the acrylic copolymer in the optical packet were approximately 2:1:1. The coextruded layer stack was cast through a die, and formed into a cast web by electrostatically pinning and quenching onto a chill roll. The cast web was approximately 300 microns thick. The cast web was furthermore heated to 93 degrees C. and stretched simultaneously, at an initial rate of about 50%/sec, to approximate draw ratios of 4×4. The film was furthermore heatset after stretching to approximately 180 degrees C. The resulting optical film was approximately 20 microns thick. When viewed under conditions favoring transmitted light from a white background, the film exhibited a yellow color. When viewed under conditions favoring reflected light, the film exhibited a violet blue color. Refractive indices in the in-plane principal directions were measured using a Metricon Prism Coupler (available from Metricon, Piscataway, N.J.), in the so-called offset mode, and physical thickness was measured using a thickness gauge (Mitutoyo, Japan). The total retardation of this Film 1 was negligible, about 6 nm.

Film 2 was formed in a manner similar to the examples of cast web 1 and 2 in PCT Publication WO 2010/075363 (Merrill et al.), except that the cast web for this Film 2 was 53 microns thick. This co-extruded film comprised two polyesters. The first polyester was PEN (polyethylene naphthalate) homopolymer. The second polyester is a co-polyester referred to as PEN-Gb, described in Patent Application Publication US 2009/0273836 (Yust et al) as PEN-CHDM10, see Example 7 and Table 1 thereof. In accordance with the descriptions of cast web 1 and 2, this Film 2 was formed by co-extruding the second polyester, also comprising approximately 0.07 wt % Epolite™ 4121 infra-red absorbing dye, available from Epolin, Newark, N.J., with the first polyester into approximately 151 alternating material layers. The outer layers of the coextruded films were protective boundary layers (PBLs) comprising the first polyester. This approximately 151 layer coextruded material was further co-extruded with a final co-extruded pair of skin layers, also comprising the first polyester. The weight ratios of the feedstreams for the first polyester in the skin layers, the first polyester in the optical packet, and the second copolyester in the optical packet were approximately 2:1:1. The co-extruded layer stack was cast through a die, and formed into a cast web by electrostatically pinning and quenching onto a chill roll. The cast web was approximately 53 microns thick. The cast web was furthermore heated to 135 degrees C. and stretched simultaneously, at an initial rate of about 100%/sec, to approximate draw ratios of 4.2×2.7. The direction of highest draw and lowest draw in-plane formed the slow and fast axes of the Film 2 (which was a half-wave plate), respectively. The Film 2 was furthermore heatset after stretching to approximately 180 degrees C. The resulting Film 2 was approximately 4 microns thick. Under these conditions, it was anticipated that both polyesters would effectively orient and develop birefringence of similar extent. The refractive indices of the Film 2 were measured using a Metricon Prism Coupler (available from Metricon, Piscataway, N.J.), in the so-called offset mode. The refractive indices of the slow, fast, and thickness directions were thus measured to be 1.7747, 1.6950 and 1.506, respectively, at a measurement wavelength of 632.8 nm. The index of refraction difference between slow and fast axes was thus 0.0797 at the 632.8 nm wavelength. The retardation, i.e., the product of the refractive index difference and thickness, was thus about 320 nm, corresponding to a half-wave retardation plate for red light. The refractive indices measured at 532 nm and 404 nm revealed similar levels of retardation for green and blue light respectively. In particular, the refractive indices of the slow, fast, and thickness directions were measured to be 1.7975, 1.7183 and 1.514, respectively, at a measurement wavelength of 532 nm, and 1.869, 1.792 and 1.548, respectively, at a measurement wavelength of 404 nm. Because the individual layers of the optical packet or stack within the film (excluding the outer skins) were each significantly less than a quarter wavelength for visible wavelengths (i.e., they were ultrathin), this Film 2 was essentially clear and uncolored when viewed in transmission while using unpolarized light. Thus, the stack of ultrathin layers within this Film 2 operated as an effective medium for light in the visible spectrum. Thus, this film is an example of a STOF effective medium retardation plate.

Film 1 and Film 2 were combined into a laminated construction comprising approximately 100 micron clear, top and bottom, polycarbonate cover layers. The top and bottom polycarbonate layers each comprised two pieces of approximately 50 micron clear sheets of 3M™ polycarbonate security film available from 3M, Maplewood, Minn. The two pieces were each cut from the same sheet and crossed perpendicularly to eliminate any residual birefringence and optical retardation in each layer. The top clear sheets, Film 1, Film 2 and the bottom clear sheet were stacked in this order and laminated in a press using approximately 6000 psi pressure and 165 degrees C. for about 30 minutes. Film 1 and Film 2 were deliberately staggered so that the laminate contained areas comprising only the Film 1, areas comprising only Film 2, and areas comprising both Film 1 and Film 2, between the top and bottom cover layers. When viewed under conditions favoring transmitted light through the film, areas comprising the first (blue reflecting) film appeared substantially yellow, while the area comprising only the second film appeared substantially clear.

The laminate was furthermore visibly analyzed using two broad band visible absorbing polarizer films, e.g. as used in liquid crystal displays. The laminate was placed between two matched polarizer films. First, the polarizer films were both oriented with coincident pass axes. When the polarizers were oriented along the fast or slow axis of Film 2 (red light half-wave plate), the appearance of these films remained substantially similar to their appearance without the polarizers (discounting the transmission darkening effects of the polarizer films) when viewed with a white backlight. When the polarizers were coincidentally oriented at 45 degrees to the fast or slow axes of the Film 2, color changes appeared over the areas comprising the second film. In areas comprising only the second film, the color viewed through the film from a white backlight appeared cyan, indicating the absence of significant red light transmission, as would be expected for transmission through coincident polarizers with an intervening red half-wave plate between them. Likewise, in areas comprising both films, the color viewed through the laminate from a white backlight appeared green, indicating the absence of significant blue and red light, as would be expected for transmission through coincident polarizers with an intervening blue reflector and red half-wave plate between them. Second, the polarizer films were both oriented with perpendicular pass axes (e.g. crossed polarizers). In the cross-state, transmission through the polarizers was low and the crossed area appeared dark (black). When the crossed polarizers were oriented along the fast or slow axis of Film 2 (red light half-wave plate), the crossed state remained dark. When the crossed polarizers were coincidentally oriented at 45 degrees to the fast or slow axes of the second film, color changes appeared over the areas comprising the Film 2. In areas comprising only Film 2, or Film 2 in combination Film 1, the color viewed through the laminate from a white backlight appeared reddish brown, indicating significant red light transmission and a small degree of green light transmission.

The laminate was first treated using a diode laser tuned to 808 nm. A 2 mm×2 mm area was scanned at a power of 3 Watts, a linear rate of 40 mm/sec and a line separation of 100 microns. (The beam width at the laminate was about 50 microns). Without crossed polarizers, the laminate comprising the two overlapping Films 1 and 2 remained yellow when viewed under transmission, indicating the intact blue-light reflecting capability of the first film in the laminate. The laminate was again viewed between crossed polarizers. When the crossed polarizers were coincidentally oriented at 45 degrees to the fast or slow axes of the second film, the laminate comprising the two overlapping Films 1 and 2 showed regions of green, instead of reddish-brown, indicating a significant drop in the retardation, e.g. due to a loss of birefringence in the Film 2 after the radiant treatment. This treatment represents the process of using radiant energy, i.e. a laser, to alter the retardation of an effective medium, multilayer retarder plate (i.e. from one type of retarder plate to another) while maintaining the reflectivity of an optical film. The optically reflecting Film 1 was also itself treatable or patternable using a radiant beam at 1064 nm.

When the portion of the laminate that included only the retarder film (Film 2) was treated, a much slower scan speed of about 5 mm/sec was required to achieve significant color changes, (e.g. when viewed under crossed polarizers). Thus, the details of the laminate construction can alter the specifics of the processing conditions.

Example 2

Two STOF optical films, referred to herein as Film 3 and Film 4, were fabricated. Film 3 substantially reflected blue light, while the Film 4 approximately functioned as a half-wave plate for red and blue light. Film 3 was made nearly identically to Film 1 of Example 1. Film 4 was made similarly to Film 2 of Example 1, with small variations in the optical spectra measured in coincident and crossed polarizers. In particular, the Film 4 had a sharper initial transmission boundary between red and green light, and had a stronger influence in the blue, relative to Film 2.

Similar to Example 1, the Films 3 and 4 were combined into a laminated construction comprising approximately 100 micron clear, top and bottom, polycarbonate cover layers. The top and bottom polycarbonate layers each comprised two pieces of approximately 50 micron clear sheets of 3M™ polycarbonate security film available from 3M, Maplewood, Minn. The two pieces were each cut from the same sheet and crossed perpendicularly to eliminate any residual birefringence and optical retardation in each layer. The top clear sheets, Film 3, Film 4, and the bottom clear sheets were stacked in this order and laminated in a press using approximately 6000 psi pressure and 165 degrees C. for about 30 minutes. Films 3 and 4 were deliberately staggered so that the laminate contained areas comprising only Film 3, areas comprising only Film 4, and areas comprising both Films 3 and 4, between the top and bottom cover layers. When viewed under conditions favoring transmitted light through the film, areas comprising Film 3 (blue reflecting) appeared substantially yellow, while the area comprising only Film 4 appeared substantially clear.

Figure 11:
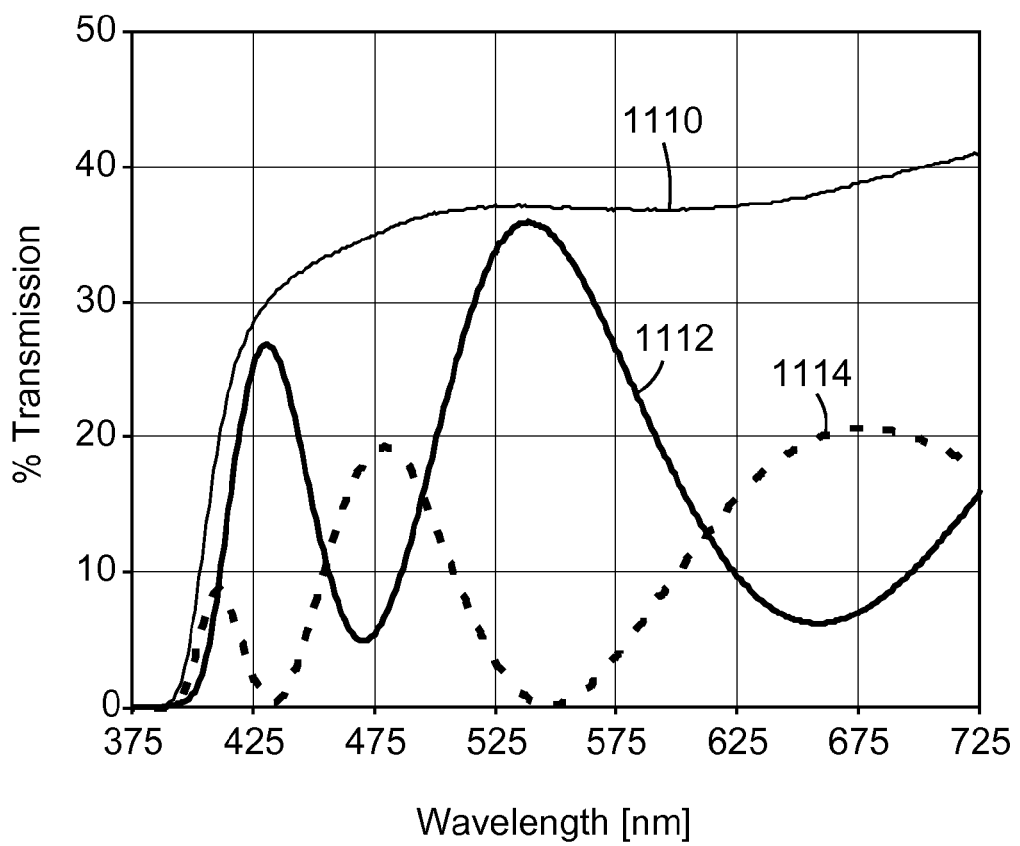
FIG. 11 is a graph of measured transmission as a function of wavelength for a sample that was fabricated.

Spectral transmission measurements of the laminate of this Example 2 were taken with a Lambda 950 spectrophotometer equipped with a large integrating sphere, as available from Perkin-Elmer (Norwalk, Conn.). The measured transmission spectra are shown in the graph of FIG. 11. In connection with the measured spectra, and in like fashion to the observation techniques of Example 1, two polarizers were oriented at 45 degrees to the fast/slow axes of Film 4, in coincident pass state and crossed pass state configurations. The crossed state of the polarizers was well below 1% transmission across the visible band, and is not presented in FIG. 11. The transmission of unpolarized light through the two coincident polarizers is represented by curve 1110. This is a reference pass state. Curve 1112 in FIG. 11 represents the transmission through the laminate in a region that included only Film 4, placed between the coincident polarizers. Two transmission minima occur at 650 nm (red) and 470 nm (blue). Curve 1114 in FIG. 11 represents transmission through the laminate in a region that included Film 4, placed between the crossed polarizers, and exhibits a complementary transmission pattern of minima and maxima relative to curve 1112.

The laminate of Example 2 was also inspected visually with the polarizers oriented at 45 degrees to the fast or slow axes of the second film. In areas comprising only Film 4, the color viewed through the film between coincident (parallel) polarizers from a white backlight appeared a greenish cyan, while the color was approximately magenta between crossed polarizers. In areas comprising both Film 3 and Film 4, the color viewed through the film between coincident (parallel) polarizers from a white backlight appeared green, while the color was approximately red between crossed polarizers.

The laminate of Example 2 was first treated using a YAG laser tuned to 1064 nm. A 2 mm×2 mm area was scanned at a power of 3.2 Watts at 375 Khz pulse rate, a linear scan rate of 125 mm/sec, and a line separation of 100 microns. The beam width at the laminate was about 50 microns. In this manner, the Film 3 was treated with radiant energy to form a nearly clear state. When treated areas comprising the overlap of both Films 3 and 4 were viewed under conditions favoring transmitted light, the resulting colors were similar to areas comprising only untreated Film 4. Between crossed polarizers at 45 degrees to the fast/slow axes of Film 4, the treated areas of Film 3 overlapping Film 4 appeared magenta, and between coincident polarizers at 45 degrees to the fast/slow axes of Film 4, the treated areas of Film 3 overlapping Film 4 appeared greenish cyan. Thus the reflectivity of the Film 3 was significantly reduced or even eliminated, e.g. due to the loss of birefringence in the PET high-index optical layers, while the retarding capabilities of Film 4 were maintained. This first treatment represents the process of using radiant energy, e.g. a laser, to change the reflectively of a spatially tailorable optical film by changing the intrinsic birefringence of that film in a construction also comprising a retarder plate, while leaving the retarder film intact. In view of the similarities in construction between Films 1 and 3 and between Films 2 and 4, one can expect that a similar treatment to Film 1 in Example 1 will also substantially reduce the reflectivity of Film 1 while leaving the retarder Film 2 intact.

Next, the laminate was treated in an area only comprising Film 4 using a diode laser tuned to 808 nm. This second scan was performed at a power of 3 W, at linear scan rates spanning 8 to 21 mm/sec with a line separation of 100 microns. The highest scan speed was near the threshold above which no color changes could be seen when viewed between polarizers. The laminate surface remained smooth to touch. As the scanning speed decreased, the colors in the treated portions progressed through a variety of colors and their complements (when viewed between coincident and crossed polarizers, respectively). For example, at 17 mm/sec, a central, majority of the treated area presented a yellow color when viewed between crossed polarizers and purple when viewed between coincident (parallel) polarizers. This may represent a partial melting of the second copolyester of the Film 4 and a concomitant loss of birefringence in the ultrathin layers of the effective medium stack within Film 4. At a scan rate of 12 to 13 mm/sec, a central, majority of the treated area presented a bluish color when viewed between crossed polarizers and yellow when viewed between coincident (parallel) polarizers. This may represent a more complete melting of the second copolyester (PEN-Gb) of the Film 4, and a concomitant loss of approximately one quarter of the total retardation (e.g. a drop from 320 nm to about 240 nm) of Film 4. At a scan rate of 10 mm/sec and below, a central, majority of the treated area presented a gray to black color when viewed between crossed polarizers and white (clear) when viewed between coincident (parallel) polarizers. This may represent the melting of both materials (PEN and PEN-Gb) in the ultrathin layers of the effective medium stack of Film 4, and a loss of half or more of the total birefringence. The lowest scan speeds may also begin the melting and loss of birefringence in the outer, relatively thicker PEN skin layers of the Film 4 from thermal diffusion emanating from the absorbing core layers.

This Example 2 thus demonstrates the progressive reduction of birefringence and retardation in a spatially tailorable retardation plate that comprises an effective medium stack of ultrathin layers. In some cases, the extent of retardation reduction may be partially controlled by preferentially changing the birefringence in some of the material layers over other layers. These preferentially changing layers can be interior layers of the film. In this example, the effective medium retardation plate as a whole is also an interior layer within a greater laminate construction. This interior layer is treated with radiant energy, such as a laser, without apparent disruption or changes to the outermost surface layer.

Example 3

A spatially tailorable optical retarder Film 5 was fabricated in a manner similar to that of Film 2 of Example 1 above; however, the film was drawn approximately 3.8 by 2.8 biaxially to a thickness of 3.9 microns. Under these conditions, it was anticipated that both polyesters would effectively orient and develop birefringence of similar extent. The refractive indices of the Film 5 were measured using a Metricon Prism Coupler (available from Metricon, Piscataway, N.J.), in the so-called offset mode. The refractive indices of the slow, fast, and thickness directions were thus measured to be 1.7647, 1.7074 and 1.50, respectively, at a measurement wavelength of 632.8 nm, 1.792, 1.730 and 1.515, respectively, at a measurement wavelength of 532 nm, and 1.876, 1.814 and 1.548, respectively, at a measurement wavelength of 404 nm. The effective principal in-plane retardations were thus approximately 225 nm, 245 nm, and 245 nm for the red, green, and blue wavelengths 632.8 nm, 532 nm, and 404 nm, respectively. Because the individual layers of the optical packet or stack within the film (excluding the outer skins) were each significantly less than a quarter wavelength for visible wavelengths (i.e., they were ultrathin), this Film 5 was essentially clear and uncolored when viewed in transmission while using unpolarized light. Thus, the stack of ultrathin layers within this Film 5 operated as an effective medium for light in the visible spectrum. Evaluation of Film 5 revealed that Film 5 functioned as a blue half-wave retarder plate at normal incidence. When Film 5 was viewed between coincident (parallel) polarizers at 45 degrees to the fast/slow axes, the transmitted light was yellow. When viewed between crossed polarizers at 45 degrees to the fast/slow axes, the transmitted light was blue.

In view of the similarity of Film 5 to Films 2 and 4, one may expect that Film 5 can be pattern-wise converted in a similar fashion to Films 2 and 4.

Example 4

Prophetic

A spatially tailorable optical retarder Film 6 can be made in a manner similar to that of Film 5, except that the amount of Epolite™ 4121 infra-red absorbing dye can be changed. For example, Film 6 can be made using 0.14 wt % of Epolite™ 4121 by using twice as much masterbatch as that used in Example 2.

The teachings of this application can be used in combination with the teachings of any or all of the following commonly assigned applications, which are incorporated herein by reference: Patent Application Publication US 2011/0255163 (Merrill et al.), "Internally Patterned Multilayer Optical Films Using Spatially Selective Birefringence Reduction"; Patent Application Publication US 2011/0249332 (Merrill et al.), "Multilayer Optical Films Having Side-by-Side Mirror/Polarizer Zones"; Patent Application Publication US 2011/0255167 (Merrill et al.), "Multilayer Optical Films Suitable for Bi-Level Internal Patterning"; Patent Application Publication US 2011/0249334 (Merrill et al.), "Internally Patterned Multilayer Optical Films With Multiple Birefringent Layers"; Patent Application Publication US 2011/0286095 (Merrill et al.), "Multilayer Optical Films Having Side-by-Side Polarizer/Polarizer Zones"; and the following international applications filed on Jun. 29, 2011: PCT/US2011/042358, "Diffuse Reflective Optical Films With Spatially Selective Birefringence Reduction"; PCT/US2011/042368, "Mask Processing Using Films With Spatially Selective Birefringence Reduction"; and PCT/US2011/042364, "Retarder Film Combinations with Spatially Selective Birefringence Reduction". Thus, for example, composite optical bodies or films can be made that incorporate one or more of the effective medium stacks of contiguous ultrathin layers as disclosed herein, optionally in combination with other optical films including without limitation one or more reflective polarizer films and/or one or more mirror films and/or one or more unitary retarder films, any or all of which can be provided with appropriate absorption characteristics such that one or more radiant beams can be used to pattern or treat portions of selected ones of the layer(s) or film(s). Blocking layers or films can also be incorporated in such composite optical bodies or films to permit patterning or treatment of one or some optical layers or films independent of other optical layers or films. Such composite films or articles may provide patterned retardation and/or patterned reflectivity over the visible spectrum.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the disclosed transparent conductive articles may also include an anti-reflective coating and/or a protective hard coat. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. An optical article, comprising:
   a retarder film providing a first light retardation and comprising an effective medium stack of contiguous ultrathin layers configured to provide an effective optical medium for visible light, the ultrathin layers arranged into a plurality of optical repeat units each of which has an optical thickness of less than 190 nm, the ultrathin layers including different first and second ultrathin layers, the first ultrathin layers comprising a first polymer material exhibiting a first intrinsic birefringence, and the second ultrathin layers comprising a second polymer material;
   wherein the retarder film has a first absorption characteristic suitable to, upon exposure to a first radiant beam, absorptively heat the effective medium stack by an amount sufficient to change the first light retardation to a second light retardation, different from the first light retardation, while maintaining a structural integrity of the effective medium stack,
   wherein the stack of contiguous ultrathin layers includes the first ultrathin layers alternating with the second ultrathin layers, and wherein each of the optical repeat units include one of the first ultrathin layers and one of the second ultrathin layers,
   wherein the second polymer material exhibits a second intrinsic birefringence different from the first intrinsic birefringence, and
   wherein the first and second ultrathin layers are configured such that upon exposure of the retarder film to a second radiant beam different from the first radiant beam, the effective medium stack is heated by an amount sufficient to change the first light retardation to a third light retardation, different from the first and second light retardations, while maintaining the structural integrity of the effective medium stack.

2. The article of claim 1, wherein the second intrinsic birefringence is opposite in sign relative to the first intrinsic birefringence.

3. The article of claim 1, wherein the second light retardation is greater than the first light retardation.

4. The article of claim 3, wherein the first light retardation is an insignificant retardation for visible light, the insignificant retardation being less than 20 nm over a wavelength range from 380 to 780 nm, and the second light retardation is a significant retardation for visible light, the significant retardation being at least 95 nm over the 380 to 780 nm wavelength range.

5. The article of claim 1, wherein the second polymer material has a melting temperature different from that of the first polymer material such that upon exposure of the retarder film to the first radiant beam, the absorptive heating is sufficient to change the first intrinsic birefringence of the first ultrathin layers without substantially changing the second intrinsic birefringence of the second ultrathin layers.

6. The article of claim 1, wherein the first ultrathin layers, the second ultrathin layers, or both the first and second ultrathin layers include a radiant energy absorbing agent.

7. The article of claim 1, wherein the effective medium stack comprises at least 10 contiguous ultrathin layers.

8. The article of claim 1, further comprising:
   a diffuse reflective layer; and
   a polarizer;
   wherein the polarizer is disposed between the diffuse reflective layer and the retarder film.

9. A security document comprising the article of claim 1, wherein the retarder film comprises indicia defined by one or more first areas having the first light retardation and one or more second areas having the second light retardation.

10. The security document of claim 9, wherein the security document is or comprises at least one of an ID document, a passport, a vehicle license plate, a product package, an identification badge, a license, a card, a pass, a label, a certificate, a bond, a title document, a negotiable instrument, and currency.

11. The article of claim 1, wherein the retarder film having the first light retardation is a first biaxial retarder film, and the second light retardation is that of a second biaxial retarder film.

12. The article of claim 1, wherein the retarder film having the first light retardation is a c-plate retarder film, and the second light retardation is that of an a-plate retarder film.

13. The article of claim 1, wherein the retarder film having the first light retardation is a biaxial retarder film, and the second light retardation is that of a c-plate retarder film or an a-plate retarder film.

14. The article of claim 1, wherein the retarder film having the first light retardation is an a-plate retarder film, and the second light retardation is that of a c-plate retarder film.

15. A method, comprising:
   providing a retarder film having a first light retardation, the retarder film comprising an effective medium stack of contiguous ultrathin layers configured to provide an effective optical medium for visible light, the ultrathin layers including different first and second ultrathin layers, the first ultrathin layers comprising a first polymer material exhibiting a first intrinsic birefringence, and the second ultrathin layers comprising a second polymer material, the ultrathin layers being arranged into a plurality of optical repeat units each of which has an optical thickness of less than 190 nm;
   exposing an area of the retarder film to a first radiant beam effective to absorptively heat the retarder film by an amount sufficient to change the first light retardation to a second light retardation, different from the first light retardation, in the area;
   wherein the second light retardation is greater than the first light retardation,
   wherein the effective medium stack includes the first ultrathin layers alternating with the second ultrathin layers, the first polymer material exhibiting a first intrinsic birefringence, the second polymer material exhibiting a second intrinsic birefringence different from the first intrinsic birefringence, the first and second polymer materials having different melting temperatures, and wherein the exposing step is carried out to preferentially reduce intrinsic birefringence in the first ultrathin layers rather than in the second ultrathin layers, and
   the method further comprising exposing a second area of the film to a second radiant beam, the second radiant beam being effective to substantially reduce intrinsic birefringence in both the first ultrathin layers and the second ultrathin layers to provide a third light retardation different from the first and second light retardations.

16. The method of claim 15, wherein the first light retardation is an insignificant retardation for visible light, the insignificant retardation being less than 20 nm over a wavelength range from 380 to 780 nm, and the second light retardation is a significant retardation for visible light, the significant retardation being at least 95 nm over the 380 to 780 nm wavelength range.

17. The method of claim 16, wherein the second light retardation corresponds to a quarter wave plate for at least one wavelength in the 380 to 780 nm wavelength range.

18. The method of claim 16, wherein the second light retardation corresponds to a half wave plate for at least one wavelength in the 380 to 780 nm wavelength range.

19. The method of claim 15, wherein the exposing step is carried out to provide indicia defined by one or more first areas having the first light retardation and one or more second areas having the second light retardation, the method further comprising:

attaching the retarder film to a security document.

20. The method of claim 19, further comprising, after the exposing step, inspecting the retarder film using at least one polarizer.

\* \* \* \* \*

UNITED STATES PATENT AND TRADEMARK OFFICE
CERTIFICATE OF CORRECTION

PATENT NO.       : 9,081,147 B2                                     Page 1 of 1
APPLICATION NO.  : 13/342807
DATED            : July 14, 2015
INVENTOR(S)      : William Merrill It is certified that error appears in the above-identified patent and that said Letters Patent is hereby corrected as shown below:

Specification

Column 6
Line 35, Delete "61/360,127," and insert -- 61/360,127 (Attorney Docket No. 66473US002), --, therefor.

Line 38, Delete "PCT/US2011/042364," and insert -- PCT/US2011/042364 (Attorney Docket No. 66473 WO003), --, therefor.

Column 11
Line 61, Delete "$n_{z,baseline}=\text{sqrt}\{E_{z,baseline}\}\text{sqrt}\{f_1 \cdot E_{1z}+f_2 \cdot E_{2x}\}$" and insert
-- $n_{z,baseline} = \text{sqrt}\{E_{z,baseline}\} = \text{sqrt}\{f_1 \cdot E_{1z} + f_2 \cdot E_{2z}\}$ --, therefor.

Signed and Sealed this
Twenty-second Day of March, 2016

Michelle K. Lee
*Director of the United States Patent and Trademark Office*